United States Patent
Ramalingam

(10) Patent No.: US 12,242,620 B2
(45) Date of Patent: Mar. 4, 2025

(54) METHODS AND APPARATUS TO ENCRYPT MEDIA FOR IDENTIFICATION

(71) Applicant: The Nielsen Company (US), LLC, New York, NY (US)

(72) Inventor: Venkadachalam Ramalingam, Nagercoil (IN)

(73) Assignee: The Nielsen Co. (LLC), New York, NY (US)

( * ) Notice: Subject to any disclaimer, the term of this patent is extended or adjusted under 35 U.S.C. 154(b) by 312 days.

(21) Appl. No.: 17/971,461

(22) Filed: Oct. 21, 2022

(65) Prior Publication Data

US 2023/0045053 A1 Feb. 9, 2023

Related U.S. Application Data

(63) Continuation of application No. PCT/US2021/028482, filed on Apr. 21, 2021, which
(Continued)

(30) Foreign Application Priority Data

Apr. 23, 2020 (IN) .............................. 202011017496

(51) Int. Cl.
*G06F 21/60* (2013.01)
*G06F 17/16* (2006.01)
*G06F 21/10* (2013.01)

(52) U.S. Cl.
CPC ............ *G06F 21/602* (2013.01); *G06F 17/16* (2013.01); *G06F 21/10* (2013.01)

(58) Field of Classification Search
CPC ......... G06F 21/602; G06F 17/16; G06F 21/10
See application file for complete search history.

(56) References Cited

U.S. PATENT DOCUMENTS

| | | | | |
|---|---|---|---|---|
| 2008/0080738 | A1* | 4/2008 | Takahashi | H04N 1/32208 382/100 |
| 2009/0110231 | A1* | 4/2009 | Rzeszewski | G06T 1/0028 382/100 |

(Continued)

FOREIGN PATENT DOCUMENTS

CN 110969564 A 4/2020

OTHER PUBLICATIONS

International Searching Authority, "International Preliminary Report on Patentability," in connection with International Patent Application No. PCT/US2021/028482, issued Oct. 25, 2022, 5 pages.

(Continued)

*Primary Examiner* — Shanto Abedin

(57) ABSTRACT

Methods, apparatus, systems, and articles of manufacture are disclosed to encrypt media for identification. An example apparatus accesses a mesh points matrix. Additionally, the example apparatus sets an upper limit equal to a larger of two values of a vector, respective ones of the two values equal to elements of the vector at indices equal to respective values of a coordinate pair of the mesh points matrix and set a lower limit equal to a smaller of the two values of the vector. The example apparatus also appends a value to an encryption vector, the value based on whether the lower limit is equal to zero, the value equal to a lowest integer not less than a quotient of a number based on a square of the upper limit and two and encrypt an input matrix with the encryption vector.

21 Claims, 28 Drawing Sheets

Related U.S. Application Data is a continuation of application No. 17/187,422, filed on Feb. 26, 2021, now Pat. No. 11,841,955.

(56) References Cited

U.S. PATENT DOCUMENTS

| | | | | |
|---|---|---|---|---|
| 2009/0164762 | A1* | 6/2009 | Huang | H03M 13/1515 |
| | | | | 712/223 |
| 2015/0288518 | A1* | 10/2015 | Wiegand | H04L 9/088 |
| | | | | 380/28 |
| 2018/0232844 | A1* | 8/2018 | Cai | H04N 1/3232 |
| 2020/0019867 | A1* | 1/2020 | Nandakumar | G06N 3/048 |
| 2021/0334388 | A1 | 10/2021 | Ramalingam | |

OTHER PUBLICATIONS

International Searching Authority: "International Search Report," mailed in connection with corresponding International Patent Application No. PCT/US2021/028482 on Aug. 4, 2021, 3 pages.
International Searching Authority: "Written Opinion," mailed in connection with corresponding International Patent Application No. PCT/US2021/028482 on Aug. 4, 2021, 3 pages.

* cited by examiner

300

Form Mesh Based on Encryption Matrix

1. Variable Initialization

2. MeshPoints = {} -> Create empty list

3. Points = [] -> Create empty list

4. LOOP1 For value = 0 to Number of Row in ENC matrix

5.     Initialize R is empty list

6.     LOOP2 For IDs = 0 to Number of Col in ENC matrix

7.         IF ENC [value],[IDs] IS ONE

8.             APPEND [[value + 1], [ IDs + 1]] in R

9.         ENDIF;

10.         APPEND [[value + 1], [R]] in Points

11.     END LOOP2;

12. END LOOP1;

FIG. 3

Eliminate Overlapping Edge Connections

1. MeshPoints = Points
2. LOOP1 For IDs== 0 to number of row in Points
3.     LOOP2 For (IDs0, VALUE0) in set of Points [IDs]
4.         LOOP3 For IDs1 = 0 to number of row in Points
5.             IF IDs and IDs1 is not equal
6.                 LOOP4 For (IDs2, VALUE1) in set of Points [IDs1]
7.                     IF VALUE0 [0] found in VALUE2 and VALUE0 [1] Found in VALUE2
8.                         Assign ZERO values in MeshPoints [IDs1][1][IDs2]
9.                     END IF;
10.                 END LOOP4;
11.             END IF;
12.         END LOOP3;
13.     END LOOP2;
14. END LOOP1

Count Edge Connections

1. Initialize Points-Count as Zero

2. LOOP1 For (IDs, VALUE) in set of MeshPoints

3.     LOOP2 For (IDs0, VALUE0) in set of VALUE

4.         IF VALUE0 [0] and VALUE0 [1] is not ZERO

5.             INCREMENT ONE in Points-Count

6.         END IF;

7.     END LOOP2;

8. END LOOP1;

Generate Edge Labelling List

1. Initialize labelling-list as list and set initial value as ZERO

2. Initialize label-range as (2 * Points-Count) − 1

3. LOOP For IDs = 0 to label-range + 1

4.     IF IDs % 2 is not ZERO

5.         APPEND IDs in labelling-list

6.     END IF;

7. END LOOP;

FIG. 6

Generate Random Labels From Labelling-list

1. Initialize mesh-label as list and set initial value as ZERO

2. Initialize Random-points Generate Number of Mesh Nodes unique random value from labelling-list vector 3. LOOP For IDs = 0 to length of Random-points VECTOR

4.     APPEND labelling-list [IDs] to mesh-label

5. END LOOP;

FIG. 7

Generate Encrypted Value For Input Matrix
1. Initialize L as empty list
2. Initialize count as one
3. LOOP1 For (IDs, VALUE) in set of MeshPoints
4.     LOOP2 For (IDs0, VALUE0) in set of VALUE [1]
5.         IF VALUE0 [0] and VALUE [1] is Not ZERO
6.             GET Max-Value FROM maximum ([mesh-labels [VALUE0 [0]-1], mesh-labels [VALUE0 [1]-1]])
7.             GET Min-Value FROM minimum ([mesh-labels [VALUE0 [0]-1], mesh-labels [VALUE0 [1]-1]])
8.             IF Min-Value is ZERO
9.                 APPEND of Ceiling ((Max-Value * Max-Value)/2)) to L
10.                Increment Count by ONE
11.             ELSE
12.                APPEND of Ceiling (((Max-Value * Max-Value) - ((Min-Value + 1) * (Min-Value + 1))/2) to L
13.                Increment Count by ONE
14.             END IF;
15.         END IF;
16.     END LOOP2;
17. END LOOP1;

Formula: Ceil (max (ME0)^2 − min (ME0 + 1)^2) IF min (ME0 + 1) = 0: Ceil (max (ME0)^2)

Example:

1. ME0 = Ceil $((5^2) / 2)$ = 12.5: the lowest integer not less than 12.5 is 13

2. ME3 = Ceil $((15^2 − (5 + 1)^2) / 2)$ = 94.5: the lowest integer not less than 94.5 is 95

.
.
.

N. ME21 = Ceil $((17^2 − (7 + 1)^2) / 2)$ = 112.5: the lowest integer not less than 112.5 is 113

Encryption Vector = [13, 95 . . . 113]

FIG. 9

| 86 | 94 | 90 | 93 | 98 | 99 | 101 | 99 | 90 | 111 | 172 | 184 | 165 | 136 | 119 | 108 | 105 | 95 | 90 | 97 | 96 |
|---|---|---|---|---|---|---|---|---|---|---|---|---|---|---|---|---|---|---|---|---|
| 79 | 90 | 85 | 87 | 96 | 97 | 99 | 98 | 86 | 107 | 187 | 175 | 156 | 185 | 186 | 168 | 160 | 144 | 119 | 87 | 79 |
| 84 | 92 | 92 | 88 | 94 | 98 | 98 | 99 | 89 | 106 | 190 | 185 | 168 | 182 | 177 | 182 | 185 | 185 | 187 | 108 | 72 |
| 85 | 95 | 100 | 94 | 92 | 97 | 100 | 100 | 93 | 89 | 139 | 163 | 152 | 173 | 179 | 185 | 189 | 162 | 190 | 139 | 65 |
| 75 | 77 | 87 | 90 | 87 | 93 | 103 | 105 | 101 | 96 | 99 | 92 | 88 | 119 | 124 | 123 | 131 | 162 | 181 | 122 | 62 |
| 86 | 85 | 77 | 76 | 77 | 78 | 89 | 101 | 95 | 95 | 99 | 101 | 98 | 101 | 88 | 79 | 82 | 99 | 107 | 85 | 61 |
| 109 | 96 | 89 | 89 | 90 | 110 | 122 | 118 | 110 | 114 | 111 | 109 | 110 | 107 | 96 | 92 | 70 | 41 | 54 | 54 | 51 |
| 99 | 90 | 95 | 101 | 94 | 91 | 112 | 131 | 138 | 133 | 113 | 118 | 120 | 121 | 118 | 125 | 130 | 126 | 126 | 106 | 80 |
| 73 | 74 | 83 | 90 | 91 | 76 | 95 | 123 | 141 | 142 | 130 | 128 | 129 | 129 | 139 | 137 | 128 | 127 | 156 | 169 | 133 |
| 70 | 75 | 80 | 83 | 85 | 78 | 91 | 115 | 129 | 118 | 134 | 135 | 139 | 135 | 147 | 134 | 131 | 131 | 156 | 146 | 140 |
| 58 | 66 | 71 | 79 | 84 | 76 | 84 | 95 | 106 | 113 | 123 | 139 | 133 | 144 | 147 | 132 | 138 | 153 | 146 | 153 | 126 |
| 53 | 56 | 58 | 64 | 70 | 73 | 81 | 89 | 94 | 95 | 95 | 101 | 114 | 120 | 128 | 135 | 123 | 140 | 147 | 151 | 134 |
| 87 | 98 | 82 | 89 | 88 | 81 | 76 | 74 | 55 | 26 | 17 | 19 | 18 | 19 | 19 | 21 | 20 | 19 | 21 | 23 | 24 |
| 56 | 66 | 63 | 74 | 83 | 78 | 68 | 72 | 66 | 27 | 18 | 20 | 22 | 23 | 23 | 23 | 23 | 24 | 26 | 26 | 26 |
| 89 | 54 | 30 | 45 | 60 | 67 | 62 | 58 | 58 | 35 | 21 | 24 | 24 | 25 | 25 | 24 | 25 | 26 | 27 | 27 | 27 |
| 110 | 94 | 86 | 86 | 66 | 59 | 57 | 50 | 34 | 29 | 22 | 24 | 23 | 23 | 24 | 24 | 24 | 25 | 26 | 27 | 27 |
| 99 | 94 | 99 | 105 | 112 | 112 | 113 | 118 | 42 | 15 | 21 | 21 | 22 | 23 | 23 | 24 | 24 | 23 | 23 | 25 | 26 |
| 115 | 129 | 104 | 96 | 105 | 111 | 120 | 127 | 48 | 13 | 19 | 19 | 20 | 22 | 21 | 22 | 22 | 20 | 22 | 25 | 25 |
| 27 | 28 | 29 | 29 | 29 | 29 | 28 | 28 | 28 | 28 | 29 | 30 | 32 | 31 | 31 | 32 | 33 | 34 | 33 | 33 | 33 |
| 29 | 29 | 29 | 29 | 30 | 30 | 29 | 29 | 29 | 28 | 28 | 30 | 30 | 31 | 30 | 31 | 31 | 32 | 32 | 33 | 33 |
| 29 | 29 | 28 | 29 | 30 | 30 | 29 | 29 | 29 | 28 | 29 | 29 | 29 | 31 | 30 | 32 | 32 | 32 | 32 | 33 | 34 |
| 28 | 27 | 28 | 29 | 28 | 29 | 29 | 29 | 30 | 30 | 29 | 29 | 30 | 32 | 32 | 33 | 33 | 33 | 32 | 33 | 34 |
| 25 | 27 | 28 | 28 | 27 | 28 | 29 | 29 | 29 | 30 | 29 | 30 | 30 | 33 | 31 | 30 | 31 | 31 | 32 | 32 | 32 |
| 26 | 28 | 27 | 28 | 27 | 27 | 28 | 29 | 29 | 29 | 29 | 29 | 30 | 31 | 32 | 30 | 31 | 31 | 31 | 31 | 33 |

|    | C1 | C2 | C3 | C4 | C5 | C6 |
|----|----|----|----|----|----|----|
| R1 | 0  | 0  | 1  | 1  | 0  | 0  |
| R2 | 0  | 0  | 1  | 1  | 1  | 0  |
| R3 | 1  | 1  | 0  | 0  | 1  | 1  |
| R4 | 0  | 1  | 1  | 0  | 1  | 1  |
| R5 | 0  | 1  | 1  | 1  | 0  | 1  |
| R6 | 0  | 0  | 1  | 1  | 1  | 0  |

| 13 | 95 | 113 | 7 | 81 | 203 | 93 | 17 | 59 | 127 | 113 |

| 86 | 94 | 90 | 93 | 98 | 99 | 101 | 99 | 90 | 111 | 172 | 184 | 165 | 136 | 119 | 108 | 105 | 95 | 90 | 97 |
|---|---|---|---|---|---|---|---|---|---|---|---|---|---|---|---|---|---|---|---|
| 79 | 90 | 85 | 87 | 96 | 97 | 99 | 98 | 86 | 107 | 187 | 175 | 156 | 185 | 186 | 168 | 160 | 144 | 119 | 87 |
| 84 | 92 | 92 | 88 | 94 | 98 | 98 | 99 | 89 | 106 | 190 | 185 | 168 | 182 | 177 | 182 | 185 | 185 | 187 | 108 |
| 85 | 95 | 100 | 94 | 92 | 97 | 100 | 100 | 93 | 89 | 139 | 163 | 152 | 173 | 179 | 185 | 189 | 162 | 190 | 139 |
| 75 | 77 | 87 | 90 | 87 | 93 | 103 | 105 | 101 | 96 | 99 | 92 | 88 | 119 | 124 | 123 | 131 | 162 | 181 | 122 |
| 86 | 85 | 77 | 76 | 77 | 78 | 89 | 101 | 95 | 95 | 99 | 101 | 98 | 101 | 88 | 79 | 82 | 99 | 107 | 85 |
| 109 | 96 | 89 | 89 | 90 | 110 | 122 | 118 | 110 | 114 | 111 | 109 | 110 | 107 | 96 | 92 | 70 | 41 | 54 | 54 |
| 99 | 90 | 95 | 101 | 94 | 91 | 112 | 13 | 95 | 113 | 7 | 81 | 203 | 93 | 17 | 59 | 127 | 113 | 126 | 106 |
| 73 | 74 | 83 | 90 | 91 | 76 | 95 | 123 | 141 | 142 | 130 | 128 | 129 | 129 | 139 | 137 | 128 | 127 | 156 | 169 |
| 70 | 75 | 80 | 83 | 85 | 78 | 91 | 115 | 129 | 118 | 134 | 135 | 139 | 135 | 147 | 134 | 131 | 131 | 156 | 146 |
| 58 | 66 | 71 | 79 | 84 | 76 | 84 | 95 | 106 | 113 | 123 | 139 | 133 | 144 | 147 | 132 | 138 | 153 | 146 | 153 |
| 53 | 56 | 58 | 64 | 70 | 73 | 81 | 89 | 94 | 95 | 95 | 101 | 114 | 120 | 128 | 135 | 123 | 140 | 147 | 151 |
| 87 | 98 | 82 | 89 | 88 | 81 | 76 | 74 | 55 | 26 | 17 | 19 | 18 | 19 | 19 | 21 | 20 | 19 | 21 | 23 |
| 56 | 66 | 63 | 74 | 83 | 78 | 68 | 72 | 66 | 27 | 18 | 20 | 22 | 23 | 23 | 23 | 23 | 24 | 26 | 26 |
| 89 | 54 | 30 | 45 | 60 | 67 | 62 | 58 | 58 | 35 | 21 | 24 | 24 | 25 | 25 | 24 | 25 | 26 | 27 | 27 |

| 86 | 94 | 90 | 93 | 98 | 99 | 101 | 99 | 90 | 111 | 172 | 184 | 165 | 136 | 119 | 108 | 105 | 95 | 90 | 97 |
|---|---|---|---|---|---|---|---|---|---|---|---|---|---|---|---|---|---|---|---|
| 79 | 90 | 85 | 87 | 96 | 97 | 99 | 98 | 86 | 107 | 187 | 175 | 156 | 185 | 186 | 168 | 160 | 144 | 119 | 87 |
| 84 | 92 | 92 | 88 | 94 | 98 | 98 | 99 | 89 | 106 | 190 | 185 | 168 | 182 | 177 | 182 | 185 | 185 | 187 | 108 |
| 85 | 95 | 100 | 94 | 92 | 97 | 100 | 100 | 93 | 89 | 139 | 163 | 152 | 173 | 179 | 185 | 189 | 162 | 190 | 139 |
| 75 | 77 | 87 | 90 | 87 | 93 | 13 | 105 | 101 | 96 | 99 | 92 | 88 | 119 | 124 | 123 | 131 | 162 | 181 | 122 |
| 86 | 85 | 77 | 76 | 77 | 78 | 89 | 95 | 95 | 95 | 99 | 101 | 98 | 101 | 88 | 79 | 82 | 99 | 107 | 85 |
| 109 | 96 | 89 | 89 | 90 | 110 | 122 | 118 | 113 | 114 | 111 | 109 | 110 | 107 | 96 | 92 | 70 | 41 | 54 | 54 |
| 99 | 90 | 95 | 101 | 94 | 91 | 112 | 112 | 131 | 7 | 133 | 113 | 118 | 120 | 121 | 118 | 125 | 130 | 126 | 106 |
| 73 | 74 | 83 | 90 | 91 | 76 | 95 | 123 | 141 | 142 | 81 | 128 | 129 | 129 | 139 | 137 | 128 | 127 | 156 | 169 |
| 70 | 75 | 80 | 83 | 85 | 78 | 91 | 115 | 129 | 118 | 134 | 203 | 139 | 135 | 147 | 134 | 131 | 131 | 156 | 146 |
| 58 | 66 | 71 | 79 | 84 | 76 | 84 | 95 | 106 | 113 | 123 | 139 | 93 | 144 | 147 | 132 | 138 | 153 | 146 | 153 |
| 53 | 56 | 58 | 64 | 70 | 73 | 81 | 89 | 94 | 95 | 95 | 101 | 114 | 17 | 128 | 135 | 123 | 140 | 147 | 151 |
| 87 | 98 | 82 | 89 | 88 | 81 | 76 | 74 | 55 | 26 | 17 | 19 | 18 | 19 | 59 | 21 | 20 | 19 | 21 | 23 |
| 56 | 66 | 63 | 74 | 83 | 78 | 68 | 72 | 66 | 27 | 18 | 20 | 22 | 23 | 23 | 127 | 23 | 24 | 26 | 26 |
| 58 | 66 | 71 | 79 | 84 | 76 | 84 | 95 | 106 | 113 | 123 | 139 | 133 | 144 | 147 | 132 | 113 | 153 | 146 | 153 |
| 53 | 56 | 58 | 64 | 70 | 73 | 81 | 89 | 94 | 95 | 95 | 101 | 114 | 120 | 128 | 135 | 123 | 140 | 147 | 151 |
| 87 | 98 | 82 | 89 | 88 | 81 | 76 | 74 | 55 | 26 | 17 | 19 | 18 | 19 | 19 | 21 | 20 | 19 | 21 | 23 |
| 56 | 66 | 63 | 74 | 83 | 78 | 68 | 72 | 66 | 27 | 18 | 20 | 22 | 23 | 23 | 23 | 23 | 24 | 26 | 26 |
| 89 | 54 | 30 | 45 | 60 | 67 | 62 | 58 | 58 | 35 | 21 | 24 | 24 | 25 | 25 | 24 | 25 | 26 | 27 | 27 |
| 89 | 54 | 30 | 45 | 60 | 67 | 62 | 58 | 58 | 35 | 21 | 24 | 24 | 25 | 25 | 24 | 113 | 26 | 27 | 27 |

METHODS AND APPARATUS TO ENCRYPT MEDIA FOR IDENTIFICATION

CROSS-REFERENCE TO RELATED APPLICATIONS

This patent arises from a continuation of International Patent Application No. PCT/US2021/028482, filed Apr. 21, 2021, which is a continuation of U.S. patent application Ser. No. 17/187,422, filed Feb. 26, 2021, which claims priority from Indian Patent Application No. 202011017496, filed Apr. 23, 2020. International Patent Application No. PCT/US2021/028482; U.S. patent application Ser. No. 17/187,422; and Indian Patent Application No. 202011017496 are hereby incorporated herein by reference in their entireties. Priority to International Patent Application No. PCT/US2021/028482; U.S. patent application Ser. No. 17/187,422; and Indian patent application No. 202011017496 is hereby claimed.

FIELD OF THE DISCLOSURE

This disclosure relates generally to encryption, and, more particularly, to methods and apparatus to encrypt media for identification.

BACKGROUND

Many companies today produce images and other media for in-house use as well as for public use. For example, Facebook® creates images and other media (e.g., sound bites) that are open to the public on the Facebook® platform. Other companies, such as Universal Music Group®, provide media, such as songs or movies, that end-users can consume.

BRIEF DESCRIPTION OF THE DRAWINGS

FIG. 3 illustrates example pseudo-code to form a mesh based on the encryption matrix.

FIG. 4 illustrates example pseudo-code to eliminate overlapping edge connections in the mesh generated when executing the example pseudo-code of FIG. 3.

FIG. 5 illustrates example pseudo-code to count edge connections in the mesh generated when executing the example pseudo-code of FIGS. 3 and/or 4.

FIG. 6 illustrates example pseudo-code to generate an edge labelling list for the edge connections in the mesh generated when executing the example pseudo-code of FIGS. 3, 4, and/or 5.

FIG. 7 illustrates example pseudo-code to generate random labels from the labelling list for the edge connections in the mesh generated when executing the example pseudo-code of FIGS. 3, 4, 5, and/or 6.

FIG. 8 illustrates example pseudo-code to generate encrypted values for the input matrix based on the mesh generated when executing the example pseudo-code of FIGS. 3, 4, 5, 6, and/or 7.

FIG. 9 illustrates example results generated in when executing the example pseudo-code of FIG. 8.

FIG. 10 illustrates an example input matrix in accordance with the teachings of this disclosure.

FIG. 11 illustrates an example encryption matrix in accordance with the teachings of this disclosure.

FIG. 13 illustrates an example data representation of the encryption matrix of FIG. 11 in accordance with the teachings of this disclosure.

FIG. 15 illustrates an example data representation of the encryption matrix of FIG. 11 with overlapping edge connections removed in accordance with the teachings of this disclosure.

FIG. 19 illustrates an example encrypted input matrix in accordance with the teachings of this disclosure.

FIG. 20 illustrates an example encrypted input matrix in accordance with the teachings of this disclosure.

Figure 1:
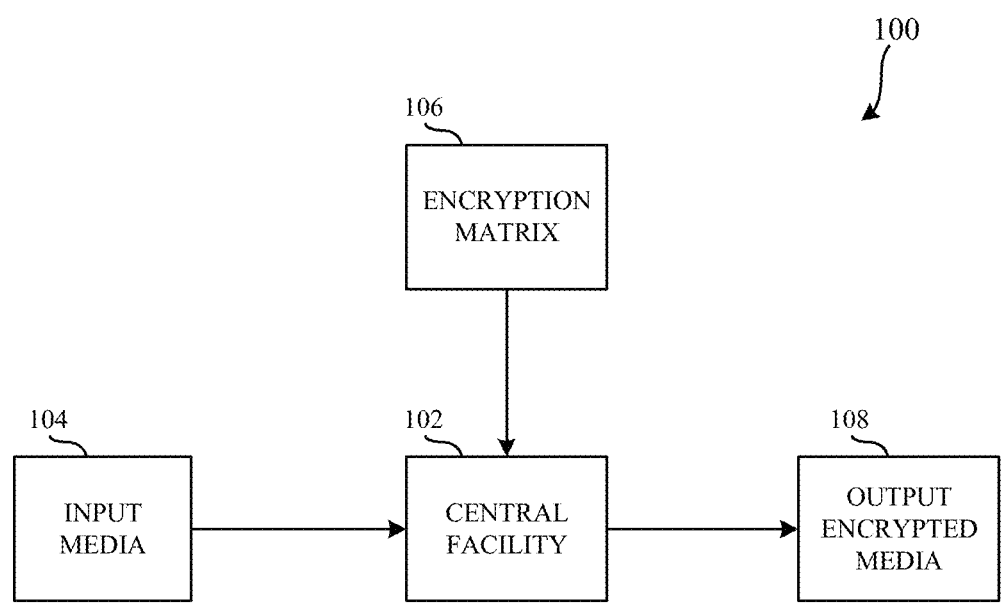
FIG. 1 is a block diagram of an environment including an example central facility to encrypt media for identification.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Many companies today produce images and other media for in-house use as well as for public use. For example, Facebook® creates images and other media (e.g., sound bites) that are open to the public on the Facebook® platform. Other companies, such as Universal Music Group®, provide media, such as songs or movies, that end-users can consume. As such, the media these companies produce is available to many thousands if not hundreds of thousands of end-users.

In some cases, an end-user may use the media in a manner inconsistent with the brand of the company that produced the media. As such, the company may seek to assert copyright protections over the media. Although the company produced the media, it may not be readily apparent to a third party that the media is copyrighted. To protect their brand and successfully assert their copyright protections, companies need a way to identify their media.

Examples disclosed herein include methods, apparatus, and articles of manufacture to encrypt media for later identification. Examples disclosed herein include encrypting a matrix on input media data based on an encryption matrix. For example, the methods, apparatus, and articles of manufacture disclosed herein encrypt one or more images based on labels assigned to edges in a mesh (e.g., a graph) formed based on an encryption matrix. Example encryption matrices disclosed herein include binary data.

As used herein, a mesh refers to a graphical representation including nodes and edges. Additionally or alternatively, the mesh can be numerically represented. As used herein, an edge refers to a connection between two nodes in a mesh.

Examples meshes disclosed herein include a number of nodes equal to the number of columns of the matrix of data represented by the mesh. For example, a mesh representative of a four by four matrix of data includes four nodes labelled along the diagonal of the matrix. Examples edges disclosed herein represent the presence of a one in the binary matrix at the intersection of the two nodes connected by the edge. Additionally, examples edges disclosed herein are oriented in the direction to indicate the location of the one in the binary matrix. For example, for two nodes labelled R1, C1 and R3, C3, an edge pointing from R1, C1 to R3, C3 indicates the presence of a one at R1, C3.

Example approaches disclosed herein include encrypting a raw input matrix (e.g., image data) with a binary matrix. Examples disclosed herein convert the binary matrix to a mesh. Examples disclosed herein eliminate overlapping edges connections in the mesh. Additionally, examples disclosed herein count the remaining edge connections, generate an edge labelling list, and generate random labels for the remaining edge connections based on the labelling list. Examples disclosed herein additionally or alternatively name the nodes of the mesh. Based on the names of the edge connections, examples disclosed herein generate encrypted values with which to encrypt the raw input matrix. With the encrypted values (e.g., an encrypted vector), examples disclosed herein encrypt the raw input matrix.

FIG. 1 is a block diagram of an environment 100 including an example central facility 102 to encrypt media for identification. The environment 100 includes the example central facility 102, an example input media 104, an example encryption matrix 106, and example output encrypted media 108.

In the illustrated example of FIG. 1, the central facility 102 can be implemented by one or more servers that encrypt input media (e.g., the input media 104) based on encryption matrices (e.g., the encryption matrix 106). For example, the central facility 102 can be an audience measurement entity. Additionally or alternatively, the central facility 102 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)).

In the illustrated example of FIG. 1, the central facility 102 receives the input media 104 and the encryption matrix 106. For example, the central facility 102 can obtain the input media 104 and/or the encryption matrix 106 from a client of the central facility 102. In additional or alternative examples, the central facility 102 can obtain the input media 104 and/or the encryption matrix 106 from a data storage local to the central facility 102. Based on the encryption matrix 106, the central facility 102 encrypts the input media 104 to generate the output encrypted media 108. In some examples, the central facility 102 transmits the output encrypted media 108 to a client. In additional or alternative examples, the central facility 102 stores the output encrypted media 108 locally at the central facility 102.

In the illustrated example of FIG. 1, the central facility 102 reads the input media 104 and the encryption matrix 106. Based on the encryption matrix, the central facility 102 forms a mesh. For example, the encryption matrix can include a binary representation of a watermark. In the example of FIG. 1, the mesh is representative of the position of ones in the encryption matrix. The central facility 102 additionally or alternatively eliminates overlapping edge connections of the mesh.

In the illustrated example of FIG. 1, the central facility 102 counts the remaining edge connections of the mesh. Based on the number of edge connections, the central facility 102 generates a labelling list for the edge connections. From the labelling list, the central facility 102 selects random labels for the edge connections. Additionally or alternatively, the central facility 102 generates labels for the nodes of the mesh. Based on the labels of the edge connections of the mesh, the central facility 102 generates encrypted values. For example, the central facility 102 can generate a vector of encrypted values. The central facility 102 then encrypts the input media 104 with the encrypted values to generate the output encrypted media 108. After encrypting the input media 104, the central facility 102 stores an encryption key to be used when decrypting the output encrypted media 108. For example, the encryption key can include the location at which encryption started in the input media 104, the technique of encryption (e.g., horizontal, diagonal, etc.), the mesh after overlaps have been removed, the labels for the edges, the labels for the nodes, and/or the encryption values (e.g., an encryption vector). The technique of encryption can be a predefined method.

In some examples, the central facility 102 can receive candidate media to decrypt. For example, a client of the central facility 102 can transmit media the client believes is being used improperly to the central facility 102. Based on the received candidate media, the central facility 102 regenerates the encryption vector. The central facility 102 additionally initializes a candidate encryption vector. Based on the encryption key for the encryption vector, the central facility 102 selects the index in the candidate matrix at which the encryption vector was encrypted. The central facility 102 then extracts data values from the candidate matrix in accordance with the encryption method until the candidate encryption vector is the same length as the encryption vector. Subsequently, the central facility 102 determines the distance between the candidate encryption vector and the encryption vector. If the distance between the two vectors is below a threshold, the central facility 102 indicates that the candidate media is owned by the client. If the distance between the two vectors is not below the threshold, the central facility 102 indicates that the candidate media is not owned by the client.

In some examples, the central facility 102 regenerates the encryption matrix with the formed mesh. For example, the central facility 102 generates an empty matrix filled with zeros. Based on the formed mesh, the central facility 102 populates the empty matrix with ones.

In the illustrated example of FIG. 1, the central facility 102 sends and/or receives Internet messages (e.g., a HyperText Transfer Protocol (HTTP) request(s)) that include the input media 104, the encryption matrix 106, and/or the output encrypted media 108. Additionally or alternatively, any other method(s) to send and/or receive the input media 104, the encryption matrix 106, and/or the output encrypted media 108 may be used such as, for example, an HTTP Secure protocol (HTTPS), a file transfer protocol (FTP), a secure file transfer protocol (SFTP), etc.

In some examples, the example central facility 102 implements example means for encrypting media. The media encryption means is implemented by executable instructions such as that implemented by at least blocks 2102, 2104, 2106, 2108, 2110, 2112, 2114, 2116, 2118, and 2120 of FIG. 21; at least blocks 2202, 2204, 2206, 2208, 2210, 2212, 2214, 2216, 2218, 2220, 2222, and 2224 of FIG. 22; at least blocks 2302, 2304, 2306, 2308, 2310, 2312, 2314, 2316, 2318, 2320, 2322, 2324, 2326, 2328, 2330, and 2332 of FIG. 23; at least blocks 2402, 2404, 2406, 2408, 2410, 2412, 2414, 2416, and 2418 of FIG. 24; at least blocks 2502, 2504, 2506, 2508, 2510, 2512, and 2514 of FIG. 25; at least blocks 2602, 2604, 2606, 2608, 2610, and 2612 of FIG. 26; at least blocks 2702, 2704, 2706, 2708, 2710, 2712, 2714, 2716, 2718, 2720, 2722, 2724, 2726, 2728, 2730, 2732, 2734, 2736, 2738, 2740, and 2742 of FIG. 27; and/or at least blocks 2802, 2804, 2806, 2808, 2810, 2812, 2814, 2816, 2820, 2822, and 2824 of FIG. 28. The executable instructions of blocks 2102, 2104, 2106, 2108, 2110, 2112, 2114, 2116, 2118, and 2120 of FIG. 21; blocks 2202, 2204, 2206, 2208, 2210, 2212, 2214, 2216, 2218, 2220, 2222, and 2224 of FIG. 22; blocks 2302, 2304, 2306, 2308, 2310, 2312, 2314, 2316, 2318, 2320, 2322, 2324, 2326, 2328, 2330, and 2332 of FIG. 23; blocks 2402, 2404, 2406, 2408, 2410, 2412, 2414, 2416, and 2418 of FIG. 24; blocks 2502, 2504, 2506, 2508, 2510, 2512, and 2514 of FIG. 25; at least blocks 2602, 2604, 2606, 2608, 2610, and 2612 of FIG. 26; blocks 2702, 2704, 2706, 2708, 2710, 2712, 2714, 2716, 2718, 2720, 2722, 2724, 2726, 2728, 2730, 2732, 2734, 2736, 2738, 2740, and 2742 of FIG. 27; and/or blocks 2802, 2804, 2806, 2808, 2810, 2812, 2814, 2816, 2820, 2822, and 2824 of FIG. 28 may be executed on at least one processor such as the example processor 2912 of FIG. 29. In other examples, the media encryption means is implemented by hardware logic, hardware implemented state machines, logic circuitry, and/or any other combination of hardware, software, and/or firmware.

Figure 2:
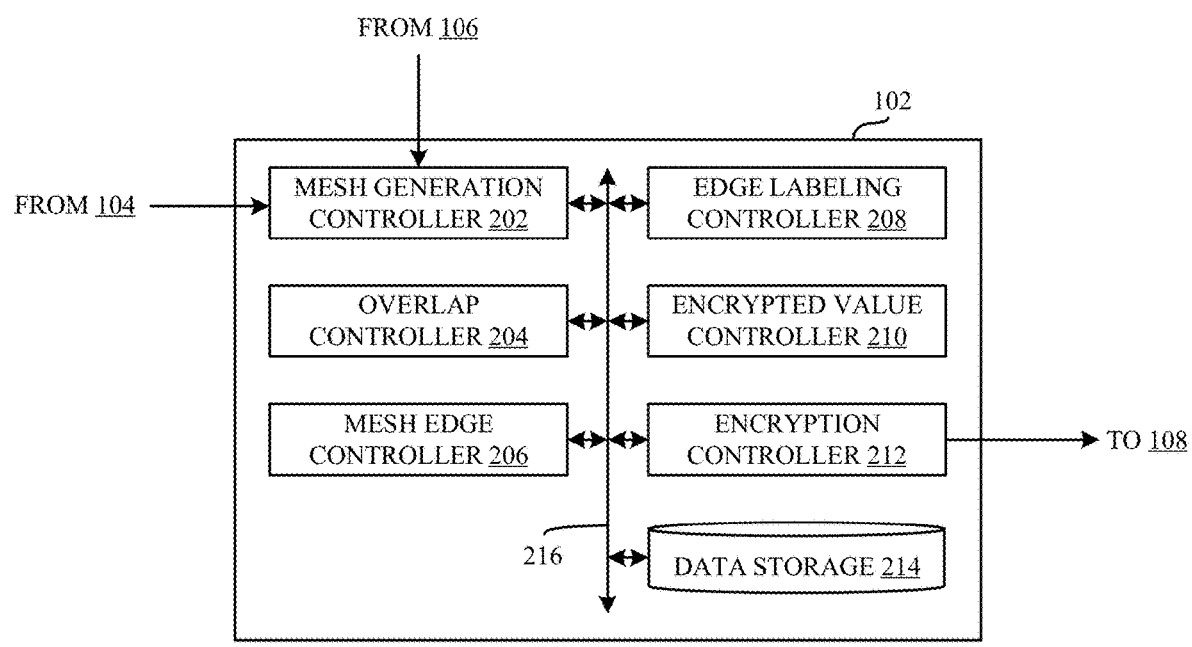
FIG. 2 is a block diagram showing additional detail of the example central facility of FIG. 1.

FIG. 2 is a block diagram showing additional detail of the example central facility 102 of FIG. 1. The example central facility 102 includes an example mesh generation controller 202, an example overlap controller 204, an example mesh edge controller 206, an example edge labelling controller 208, an example encrypted value controller 210, an example encryption controller 212, and an example data storage 214. In the example of FIG. 2, any of the mesh generation controller 202, the overlap controller 204, the mesh edge controller 206, the edge labelling controller 208, encrypted value controller 210, the encryption controller 212, and/or the data storage 214 can communicate via an example communication bus 216. In examples disclosed herein, the communication bus 216 may be implemented using any suitable wired and/or wireless communication. In additional or alternative examples, the communication bus 216 includes software, machine readable instructions, and/or communication protocols by which information is communicated among the mesh generation controller 202, the overlap controller 204, the mesh edge controller 206, the edge labelling controller 208, encrypted value controller 210, the encryption controller 212, and/or the data storage 214.

In the illustrated example of FIG. 2, the mesh generation controller 202 can be implemented by one or more analog or digital circuit(s), logic circuits, programmable processor(s), programmable controller(s), GPU(s), DSP(s), ASIC(s), PLD(s) and/or FPLD(s). The mesh generation controller 202 reads input media (e.g., the input media 104). For example, input media may be represented as a matrix. In such an example, the mesh generation controller 202 reads the input matrix. Additionally, the mesh generation controller 202 reads encryption matrices (e.g., the encryption matrix 106). For example, the mesh generation controller 202 can read an encryption matrix received from a client. In additional or alternative examples, the mesh generation controller 202 can read an encryption matrix from the data storage 214.

In the illustrated example of FIG. 2, the mesh generation controller 202 forms a mesh based on the encryption matrix.

For example, the mesh generation controller 202 initializes a Mesh Points matrix and a Points matrix. Additionally, for the first row of the encryption matrix, the mesh generation controller 202 initializes a row matrix. The mesh generation controller 202 determines whether the value at the first column of the first row of the encryption matrix equals one. If the mesh generation controller 202 determines that the value at the first column of the first row of the encryption matrix (e.g., R1, C1) equals one, then the mesh generation controller 202 appends the row index and the column index to the row matrix. If not, and subsequently, the mesh generation controller 202 appends the row index and the row matrix to the Points matrix. The mesh generation controller 202 iterates through each column of the first row and the remaining rows of the encryption matrix. The Points matrix is representative of the row and column coordinate pair at which a one is located in the encryption matrix for each row. Additionally, the mesh generation controller 202 determines whether there are subsequent input matrices.

In some examples, the example mesh generation controller 202 implements example means for controlling generation of meshes. The mesh generation controlling means is implemented by executable instructions such as that implemented by at least blocks 2102, 2104, 2106, and 2120 of FIG. 21 and/or at least blocks 2202, 2204, 2206, 2208, 2210, 2212, 2214, 2216, 2218, 2220, 2222, and 2224 of FIG. 22. The executable instructions of blocks 2102, 2104, 2106 of FIG. 21 and blocks 2202, 2204, 2206, 2208, 2210, 2212, 2214, 2216, 2218, 2220, 2222, and 2224 of FIG. 22 may be executed on at least one processor such as the example processor 2912 of FIG. 29. In other examples, the mesh generation controlling means is implemented by hardware logic, hardware implemented state machines, logic circuitry, and/or any other combination of hardware, software, and/or firmware.

Example pseudo-code to implement the mesh generation controller 202 is illustrated and described in connection with FIG. 3. A graphical representation of an example mesh generated by the mesh generation controller 202 is illustrated and described in connection with FIG. 12. A numerical representation of an example mesh generated by the mesh generation controller 202 is illustrated and described in connection with FIG. 13.

In the illustrated example of FIG. 2, the overlap controller 204 can be implemented by one or more analog or digital circuit(s), logic circuits, programmable processor(s), programmable controller(s), GPU(s), DSP(s), ASIC(s), PLD(s) and/or FPLD(s). The overlap controller 204 eliminates overlapping edge connections of the mesh generated by the mesh generation controller 202. For example, the overlap controller 204 sets the Mesh Points matrix equal to the Points matrix. The overlap controller 204 selects the first row of the Points matrix. For the selected row, the overlap controller 204 selects the first coordinate pair. Additionally, the overlap controller 204 selects an additional row in the Points matrix.

In the illustrated example of FIG. 2, the overlap controller 204 determines whether the current row index equal the current temporary row index. If the overlap controller 204 determines that the current row index is equal to the current temporary row index, the overlap controller 204 increments the temporary row index. Subsequently and if the overlap controller 204 determines that the current row index is not equal to the current temporary row index, the overlap controller 204 selects the first coordinate pair for the first temporary row index.

In the illustrated example of FIG. 2, the overlap controller 204 determines whether the current coordinate pair for the current row index includes the same values as the current coordinate pair for the temporary row index. If the overlap controller 204 determines that the current coordinate pair for the current row index includes the same values as the current coordinate pair for the temporary row index, the overlap controller 204 assigns zero values for the current coordinate pair for the temporary row index in the Mesh Points matrix. For example, if the current coordinate pair for the current row index in the Points matrix is R1, C3 and the current coordinate pair for the temporary row index in the Points matrix is R3, C1, the overlap controller 204 sets zero values at R3, C1 in the Mesh Points matrix. Subsequently and if the overlap controller 204 determines that the current coordinate pair for the current row index does not include the same values as the current coordinate pair for the temporary row index, the overlap controller 204 determines whether there are additional coordinate pairs for the current temporary row index.

In the illustrated example of FIG. 2, if the overlap controller 204 determines that there are additional coordinate pairs for the current temporary row index, the overlap controller 204 increments the coordinate pair for the current temporary row index. If the overlap controller 204 determines that there are not additional coordinate pairs for the current temporary row index, the overlap controller 204 determines whether there are additional temporary row indices. If the overlap controller 204 determines that there are additional temporary row indices, the overlap controller 204 increments the temporary row index and selects the first coordinate pair for the current temporary row index.

In the illustrated example of FIG. 2, if the overlap controller 204 determines that there are not additional temporary row indices, the overlap controller 204 determines whether there are additional coordinate pairs for the current row index. If the overlap controller 204 determines that there are additional coordinate pairs for the current row index, the overlap controller 204 increments the coordinate pair for the current row index and selects a first temporary row index in Points matrix. If the overlap controller 204 determines that there are not additional coordinate pairs for the current row index, the overlap controller 204 determines whether there are additional rows in the Points matrix. If the overlap controller 204 determines that there are additional rows in the Points matrix, the overlap controller 204 increments the row index and selects the first coordinate pair for the selected row.

In some examples, the example overlap controller 204 implements example means for controlling overlapping edges. The overlapping edge controlling means is implemented by executable instructions such as that implemented by at least block 2108 of FIG. 21 and/or at least blocks 2302, 2304, 2306, 2308, 2310, 2312, 2314, 2316, 2318, 2320, 2322, 2324, 2326, 2328, 2330, and 2332 of FIG. 23. The executable instructions of block 2108 of FIG. 21 and/or blocks 2302, 2304, 2306, 2308, 2310, 2312, 2314, 2316, 2318, 2320, 2322, 2324, 2326, 2328, 2330, and 2332 of FIG. 23 may be executed on at least one processor such as the example processor 2912 of FIG. 29. In other examples, the overlapping edge controlling means is implemented by hardware logic, hardware implemented state machines, logic circuitry, and/or any other combination of hardware, software, and/or firmware.

Example pseudo-code to implement the overlap controller 204 is illustrated and described in connection with FIG. 4. A graphical representation of the example mesh generated by the mesh generation controller 202 after being processed by the overlap controller 204 is illustrated and described in connection with FIG. 14. A numerical representation of the example mesh generated by the mesh generation controller 202 after being processed by the overlap controller 204 is illustrated and described in connection with FIG. 15.

In the illustrated example of FIG. 2, the mesh edge controller 206 can be implemented by one or more analog or digital circuit(s), logic circuits, programmable processor(s), programmable controller(s), GPU(s), DSP(s), ASIC(s), PLD(s) and/or FPLD(s). The mesh edge controller 206 counts the remaining edge connections of the mesh generated by the mesh generation controller 202 and processed by the overlap controller 204. For example, the mesh edge controller 206 initializes a Points Count as zero. The mesh edge controller 206 selects the first row of the Mesh Points matrix. For the selected row, the mesh edge controller 206 selects the first coordinate pair.

In the illustrated example of FIG. 2, the mesh edge controller 206 determines whether the coordinate pair includes all zero values. If the mesh edge controller 206 determines that the coordinate pair does not include all zero values, the mesh edge controller 206 increments the Points Count. Subsequently and if the mesh edge controller 206 determines that the coordinate pair includes all zero values, the mesh edge controller 206 determines whether there are additional coordinate pairs for the current row index.

In the illustrated example of FIG. 2, if the mesh edge controller 206 determines that there are additional coordinate pairs for the current row index, the mesh edge controller 206 increments the current coordinate pair and determines whether the current coordinate pair includes all zero values. If the mesh edge controller 206 determines there are not additional coordinate pairs for the current row index, the mesh edge controller 206 determines whether there are additional rows in the Mesh Points matrix. If the mesh edge controller 206 determines that there are additional rows in the Mesh Points matrix, the mesh edge controller 206 increments the current row index and selects the first coordinate pair for the selected row. Example pseudo-code to implement the mesh edge controller 206 is illustrated and described in connection with FIG. 5. A graphical representation of the example mesh generated by the mesh generation controller 202 after being processed by the overlap controller 204, and the mesh edge controller 206 is illustrated and described in connection with FIG. 16.

In some examples, the example mesh edge controller 206 implements example means for controlling mesh edges. The mesh edge controlling means is implemented by executable instructions such as that implemented by at least block 2110 of FIG. 21 and/or at least blocks 2402, 2404, 2406, 2408, 2410, 2412, 2414, 2416, and 2418 of FIG. 24. The executable instructions of block 2110 of FIG. 21 and/or blocks 2402, 2404, 2406, 2408, 2410, 2412, 2414, 2416, and 2418 of FIG. 24 may be executed on at least one processor such as the example processor 2912 of FIG. 29. In other examples, the mesh edge controlling means is implemented by hardware logic, hardware implemented state machines, logic circuitry, and/or any other combination of hardware, software, and/or firmware.

In the illustrated example of FIG. 2, the edge labelling controller 208 can be implemented by one or more analog or digital circuit(s), logic circuits, programmable processor(s), programmable controller(s), GPU(s), DSP(s), ASIC(s), PLD(s) and/or FPLD(s). The edge labelling controller 208 generates an edge labelling list based on the number of edge connections counted by the mesh edge controller 206. Additionally or alternatively, the edge labelling controller 208 generates random labels for the edge connections based on the labelling list.

In the illustrated example of FIG. 2, the edge labelling controller 208 initializes the labelling list as a vector including zero as the first index. The edge labelling controller 208 initializes a label range variable as two times the value of Points Count minus one. Additionally, the edge labelling controller 208 sets a temporary index equal to zero.

In the illustrated example of FIG. 2, the edge labelling controller 208 determines whether the remainder of the current index divided by two equal zero. If the edge labelling controller 208 determines that the remainder of the current index divided by two does not equal zero, the edge labelling controller 208 appends the value of label range at the current index to the labelling list vector. Subsequently and if the edge labelling controller 208 determines that the remainder of the current index divided by two does equal zero, the edge labelling controller 208 determines whether the current index is equal to the length of the label range variable when listed. If the edge labelling controller 208 determines that the current index is not equal to the length of the label range variable when listed, the edge labelling controller 208 increments the temporary index and determines whether the remainder of the current index divided by two equals zero.

In the illustrated example of FIG. 2, the edge labelling controller 208 initializes a mesh label list as a vector with the first index as zero. The edge labelling controller 208 initializes a random points lists as a vector including random values from the labelling list vector. The number of indices of the random points vector is equal to the number of rows in the encryption matrix. The edge labelling controller 208 selects the first index of the random points vector and appends the value of the labelling list vector at the value of the current index to the mesh label vector.

In the illustrated example of FIG. 2, the edge labelling controller 208 determines whether there are additional indices in the random points vector. If the edge labelling controller 208 determines that there are additional indices in the random points vector, the edge labelling controller 208 increments the random points index and appends the value of the labelling list vector at the value of the current index of the random points vector to the mesh label vector. Example pseudo-code to implement the edge labelling controller 208 is illustrated and described in connection with FIGS. 6 and 7.

In some examples, the example edge labelling controller 208 implements example means for controlling labelling of edges. The edge labelling controlling means is implemented by executable instructions such as that implemented by at least blocks 2112 and 2114 of FIG. 21; at least blocks 2502, 2504, 2506, 2508, 2510, 2512, and 2514 of FIG. 25; and/or at least blocks 2602, 2604, 2606, 2608, 2610, and 2612 of FIG. 26. The executable instructions of blocks 2112 and 2114 of FIG. 21; blocks 2502, 2504, 2506, 2508, 2510, 2512, and 2514 of FIG. 25; and/or blocks 2602, 2604, 2606, 2608, 2610, and 2612 of FIG. 26 may be executed on at least one processor such as the example processor 2912 of FIG. 29. In other examples, the edge labelling controlling means is implemented by hardware logic, hardware implemented state machines, logic circuitry, and/or any other combination of hardware, software, and/or firmware.

In the illustrated example of FIG. 2, the encrypted value controller 210 can be implemented by one or more analog or digital circuit(s), logic circuits, programmable processor(s), programmable controller(s), GPU(s), DSP(s), ASIC(s), PLD(s) and/or FPLD(s). The encrypted value controller 210 generates encrypted values (e.g., an encryption vector) based on the random labels generated by the edge labelling controller 208.

In the illustrated example of FIG. 2, the encrypted value controller 210 initializes an encryption vector (e.g., a pixel value vector). The encrypted value controller 210 initializes an encryption values with label matrix. The encrypted value controller 210 sets a count variable to one. The encrypted value controller 210 selects the first row in the Mesh Points matrix. For the selected row, the encrypted value controller 210 selects the first coordinate pair.

In the illustrated example of FIG. 2, the encrypted value controller 210 determines whether the current coordinate pair includes all zero values. If the encrypted value controller 210 determines that the current coordinate pair includes all zero values, the encrypted value controller 210 increments the coordinate pair and determines whether the current coordinate pair includes all zero values. If the encrypted value controller 210 determines that the current coordinate pair does not include all zero values, the encrypted value controller 210 sets an upper limit equal to the larger of the values of the labelling list at the indices equal to the current coordinate pair. Additionally, the encrypted value controller 210 sets a lower limit equal to the lesser of the values of the labelling list at the indices equal to the current coordinate pair. For example, if the current coordinate pair is R1, C3, the encrypted value controller 210 sets the upper limit equal to larger of labelling-list[1] and labelling-list[3]. Additionally in such an example, the encrypted value controller 210 sets the lower limit equal to the lesser of labelling-list[1] and labelling-list[3]. In examples disclosed herein, the upper limit and lower limit correspond to the nodes connected to the edge associated with the current coordinate pair.

In the illustrated example of FIG. 2, the encrypted value controller 210 determines whether the lower limit is equal to zero. If the encrypted value controller 210 determines that the lower limit is not equal to zero, the encrypted value controller 210 determines (B) the lowest integer not less than the quotient of (1) the difference between the square of the upper limit and the square of the lower limit and (2) two. The encrypted value controller 210 subsequently appends (A) the character 'L' and the value of count and (B) to the encryption values with label matrix. Additionally, the encrypted value controller 210 appends (B) to the encryption vector and increments the count. Subsequently, the encrypted value controller 210 determines whether there are additional coordinate pairs for the current row index.

In the illustrated example of FIG. 2, if the encrypted value controller 210 determines that the lower limit is not equal to zero, the encrypted value controller 210 determines (B) the lowest integer not less than the quotient of the square of the upper limit and two. The encrypted value controller 210 subsequently appends (A) the character "L" and the value of count and (B) to the encryption values with label matrix. Additionally, the encrypted value controller 210 appends (B) to the encryption vector and increments count. Subsequently, the encrypted value controller 210 determines whether there are additional coordinate pairs for the current row index.

In the illustrated example of FIG. 2, if the encrypted value controller 210 determines that there are additional coordinate pairs for current row index, the encrypted value controller 210 increments the current coordinate pair and determines whether the current coordinate pair includes all zero values. If the encrypted value controller 210 determines that there are not additional coordinate pairs for current row index, the encrypted value controller 210 determines whether there are additional rows in the Mesh Points matrix. If the encrypted value controller 210 determines that there are additional points in the Mesh Points matrix, the encrypted value controller 210 increments the current row index and selects the first coordinate pair for the selected row.

Additionally or alternatively, the encrypted value controller 210 stores an encryption key in the data storage 214. For example, the encryption key can include the location at which encryption started in input (e.g., the input media 104), the technique of encryption (e.g., horizontal, diagonal etc.), the mesh after overlaps have been removed (e.g., the output of the overlap controller 204), the labels for the edges (e.g., the output of the edge labelling controller 208), the labels for the nodes (e.g., the upper and lower limits for each point in the Mesh Points matrix), and/or the encryption values (e.g., the pixel value vector). The technique of encryption can be a predefined method.

In the illustrated example of FIG. 2, the encrypted value controller 210 evaluates candidate input media to determine whether the candidate input media corresponds to an encryption vector (e.g., is owned by an entity associated with the encryption vector). For example, the encrypted value controller 210 regenerates the encryption vector (e.g., the pixel value vector) based on the encryption key. The encrypted value controller 210 initializes the candidate encryption vector for a candidate input media (e.g., image data) being evaluated at the central facility 102.

In the illustrated example of FIG. 2, the encrypted value controller 210 selects an index in the candidate input matrix based on the encryption key. For example, the encrypted value controller 210 selects the index at which the encryption vector was encrypted in the original input matrix. The encrypted value controller 210 appends the value at the current index to the candidate encryption vector. The encrypted value controller 210 determines whether the candidate encryption vector is as long as the candidate encryption vector.

In the illustrated example of FIG. 2, if the encrypted value controller 210 determines that the candidate encryption vector is not as long as the encryption vector, the encrypted value controller 210 increments the index of the candidate input matrix based on the encryption key (e.g., based on the technique of encryption) and appends the value at the current index to the candidate encryption vector. Additionally, the encrypted value controller 210 determines whether there are additional candidate input matrices. If the encrypted value controller 210 determines that there are additional candidate input matrices, the encrypted value controller 210 selects the next candidate input matrix and regenerates the encryption vector suspected of being associated with the candidate input matrix based on the associated encryption key.

In some examples, the example encrypted value controller 210 implements example means for controlling encrypted values. The encrypted value controlling means is implemented by executable instructions such as that implemented by at least block 2116 of FIG. 21; at least blocks 2702, 2704, 2706, 2708, 2710, 2712, 2714, 2716, 2718, 2720, 2722, 2724, 2726, 2728, 2730, 2732, 2734, and 2736 of FIG. 27; and/or at least blocks 2802, 2804, 2806, 2808, 2810, 2812, 2822, and 2824 of FIG. 28. The executable instructions of block 2116 of FIG. 21; blocks 2702, 2704, 2706, 2708, 2710, 2712, 2714, 2716, 2718, 2720, 2722, 2724, 2726, 2728, 2730, 2732, 2734, and 2736 of FIG. 27; and/or blocks 2802, 2804, 2806, 2808, 2810, 2812, 2822, and 2824 of FIG. 28 may be executed on at least one processor such as the example processor 2912 of FIG. 29. In other examples, the encrypted value controlling means is implemented by hardware logic, hardware implemented state machines, logic circuitry, and/or any other combination of hardware, software, and/or firmware.

Example pseudo-code to implement the encrypted value controller 210 is illustrated and described in connection with FIG. 8. A graphical representation of the example mesh generated by the mesh generation controller 202 after being processed by the overlap controller 204, the mesh edge controller 206, the edge labelling controller 208, and the encrypted value controller 210 is illustrated and described in connection with FIG. 17. A numerical representation of the example encryption vector generated by the mesh generation controller 202 after being processed by the overlap controller 204, the mesh edge controller 206, the edge labelling controller 208, and the encrypted value controller 210 is illustrated and described in connection with FIG. 18.

In the illustrated example of FIG. 2, the encryption controller 212 can be implemented by one or more analog or digital circuit(s), logic circuits, programmable processor(s), programmable controller(s), GPU(s), DSP(s), ASIC(s), PLD(s) and/or FPLD(s). The encryption controller 212 encrypts the input matrix with the encrypted vector (e.g., encrypted values). The encryption controller 212 can encrypt the encrypted vector into the input matrix via any suitable encryption technique (e.g., horizontal, diagonal, etc.). For example, the encryption controller 212 can select an index in the input matrix in the middle of the rows and columns and insert the first index of the encryption vector at the selected index. In such an example, the encryption controller 212 increments the row and column index until all values of the encryption matrix have been inserted into the input matrix to generate the encrypted input matrix.

Additionally or alternatively, the example encryption controller 212 determines the similarity between encryption vectors and candidate encryption vectors. For example, the encryption controller 212 can determine the Euclidian distance between the vectors, the Manhattan distance between the vectors, the Minkowski distance between the vectors, the cosine similarity of the vectors, and/or the Jaccard similarity of the vectors. The example encryption controller 212 determines whether the similarity between the vectors is above a threshold (e.g., 75%, 95%, etc.). If the encryption controller 212 determines that the similarity between the vectors is at or above the threshold (e.g., meets the threshold), the encryption controller 212 indicates that the candidate encryption vector matches the encryption vector. If the encryption controller 212 determines that the similarity between the vectors is below the threshold (e.g., does not meet the threshold), the encryption controller 212 indicates that the candidate encryption vector does not match the encryption vector.

In some examples, the example encryption controller 212 implements example means for controlling encryption. The encryption controlling means is implemented by executable instructions such as that implemented by at least block 2118 of FIG. 21 and/or at least blocks 2814, 2816, 2818, and 2820 of FIG. 28. The executable instructions of block 2118 of FIG. 21 and/or blocks 2814, 2816, 2818, and 2820 of FIG. 28 may be executed on at least one processor such as the example processor 2912 of FIG. 29. In other examples, the encryption controlling means is implemented by hardware logic, hardware implemented state machines, logic circuitry, and/or any other combination of hardware, software, and/or firmware.

Numerical representations of the example encrypted input media generated by the mesh generation controller 202 after being processed by the overlap controller 204, the mesh edge controller 206, the edge labelling controller 208, the encrypted value controller 210, the encryption controller 212 are illustrated and described in connection with FIGS. 19 and 20.

In the illustrated example of FIG. 2, the data storage 214 is configured to record data (e.g., obtained information, generated messages, etc.). For example, the data storage 214 can store one or more input media matrices (e.g., the input media 104), one or more encryption matrices (e.g., the encryption matrix 106), one or more encrypted input media matrices (e.g., the output encrypted media 108), and/or one more encryption keys.

In the example of FIG. 2, the data storage 214 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The data storage 214 may additionally or alternatively be implemented by one or more double data rate (DDR) memories, such as DDR, DDR2, DDR3, DDR4, mobile DDR (mDDR), etc. The data storage 214 may additionally or alternatively be implemented by one or more mass storage devices such as hard disk drive(s), compact disk drive(s), digital versatile disk drive(s), solid-state disk drive(s), etc. While in the illustrated example the data storage 214 is illustrated as a single database, the data storage 214 may be implemented by any number and/or type(s) of databases. Furthermore, the data stored in the data storage 214 may be in any data format such as, for example, binary data, comma delimited data, tab delimited data, structured query language (SQL) structures, etc.

FIG. 3 illustrates example pseudo-code 300 to form a mesh based on the encryption matrix. For example, the pseudo-code 300 can be executed to implement the mesh generation controller 202. The pseudo-code 300 of FIG. 3 includes two loops based on size of the encryption matrix. The object of the pseudo-code 300 is to find and record (as the Points matrix) the location of non-zero elements in the encryption matrix. When executed, the pseudo-code 300 of FIG. 3, causes a processor to transforms the encryption matrix into a mesh formation. A graphical representation of an example mesh generated by the mesh generation controller 202 is illustrated and described in connection with FIG. 12. A numerical representation of an example mesh generated by the mesh generation controller 202 is illustrated and described in connection with FIG. 13.

FIG. 4 illustrates example pseudo-code 400 to eliminate overlapping edge connections in the mesh generated when executing the example pseudo-code 300 of FIG. 3. The example pseudo-code 400 implements the overlap controller 204. The object of the pseudo-code 400 is to remove the overlapping edge connections between nodes in the mesh. When executed, the example pseudo-code 400 causes a processor to check for repeating elements in the Mesh Points matrix. If a repeated element is found, the pseudo-code 400, when executed, causes a processor to set the repeated element to zero. A graphical representation of the example mesh generated by the mesh generation controller 202 after being processed by the overlap controller 204 is illustrated and described in connection with FIG. 14. A numerical representation of the example mesh generated by the mesh generation controller 202 after being processed by the overlap controller 204 is illustrated and described in connection with FIG. 15.

FIG. 5 illustrates example pseudo-code 500 to count edge connections in the mesh generated when executing the example pseudo-code of FIGS. 3 and/or 4. The example pseudo-code 500 implements the mesh edge controller 206 is illustrated and described in connection with FIG. 5. The example pseudo-code 500, when executed, causes a processor to count the edge connections between nodes. The object of the example pseudo-code 500 is to determine a count of the number of non-zero elements in the Mesh Points matrix. A zero in the Mesh Points matrix represents no connection between two edges. When executed, the pseudo-code 500 causes a processor to count the number of edge connections (e.g., a Points-Count variable). A graphical representation of the example mesh generated by the mesh generation controller 202 after being processed by the overlap controller 204, and the mesh edge controller 206 is illustrated and described in connection with FIG. 16.

FIG. 6 illustrates example pseudo-code 600 to generate an edge labelling list for the edge connections in the mesh generated when executing the example pseudo-code of FIGS. 3, 4, and/or 5. The example pseudo-code 600 implement the edge labelling controller 208. The example pseudo-code 600, when executed, causes a processor to generate a labelling list of potential labels for edge connections. The object of the pseudo-code 600 is to generate a potential label for edge connections. The pseudo-code 600, when executed, causes a processor to generate a potential label for edge connections based on the number of mesh edges (NME) (e.g., the Points-Count variable) determined when executing the pseudo-code 500. For example, the potential labels for the number can range from two times the Points-Count variable minus one. For example, if the number of mesh edges is 6, the pseudo-code 600, when executed, additionally causes a processor to generate 11 odd values starting with 0 as the labelling list.

FIG. 7 illustrates example pseudo-code 700 to generate random labels from the labelling list for the edge connections in the mesh generated when executing the example pseudo-code of FIGS. 3, 4, 5, and/or 6. The object of the pseudo-code 700 is to select random labels from the labelling list generated when executing the pseudo-code 600. The pseudo-code 700, when executed, causes a processor to select six random values form the labelling list. The number of random values generated when executing the pseudo-code 700 is based on the number of nodes in the mesh. In examples disclosed herein, the number of nodes in a mesh is equivalent to the number of columns of the encryption matrix (e.g., the encryption matrix 106). For example, if the labelling list include [0, 3, 5, 7, 9, 21], the pseudo-code 700, when executed, causes a processor to select six random values between zero and 21. For example, the six values selected can be 0, 3, 5, 11, 15, and 17. These values are stored as mesh-labels variable.

FIG. 8 illustrates example pseudo-code 800 to generate encrypted values for the input matrix based on the mesh generated when executing the example pseudo-code of FIGS. 3, 4, 5, 6, and/or 7. The object of the pseudo-code 800 is to generate encryption values 'L.' For example, a processor, when executing the pseudo-code 800, generates the encryption by first setting the larger of the values of the labelling list at the indices equal to the value of a coordinate pair as an upper limit. Second, a processor, when executing the pseudo-code 800, setting the lesser of the values of the labelling list at the indices equal to the value of the coordinate pair as a lower limit. Subsequently, a processor, when executing the pseudo-code 800, determines the encryption values as the lowest integer not less than the quotient of the difference between the square of the upper limit and the square of the lower limit and two. When the lower limit is zero, a processor, when executing the pseudo-code 800, determines the encryption values as the lowest integer not less than the quotient of the square of the upper limit and two.

FIG. 9 illustrates example results 900 generated when executing the example pseudo-code 800 of FIG. 8. For example, the results 900 include data representative of an encryption vector. As illustrated in the results 900, for node labels, A=15 and B=5, the encrypted value generated for ME3 (e.g., the second non-zero coordinate pair in the Mesh Points matrix) when executing the pseudo-code 800 of FIG. 8, is 95. Thus, the value of 95 is encrypted for the edge connecting nodes A and B.

FIG. 10 illustrates an example input matrix 1000 in accordance with the teachings of this disclosure. For example, the input matrix 1000 represents one channel (e.g., red, green, blue channel) of an image. The example input matrix 1000 is representative of sampling of raw image data and assumes grey level data. As such, the input matrix 1000 is associated with image data.

FIG. 11 illustrates an example encryption matrix 1100 in accordance with the teachings of this disclosure. The encryption matrix 1100 includes binary data (e.g., zeros and ones). The encryption matrix 1100 is a representation of a watermark to encrypt into an input matrix (e.g., the input matrix 1000). Preferably, when generating the encryption matrix 1100, the encryption matrix 1100 should be of size m by n (m×n) to avoid same row and column one elements. For example, it is preferable to avoid generating an encryption matrix including a one element at R1, C1.

Figure 12:
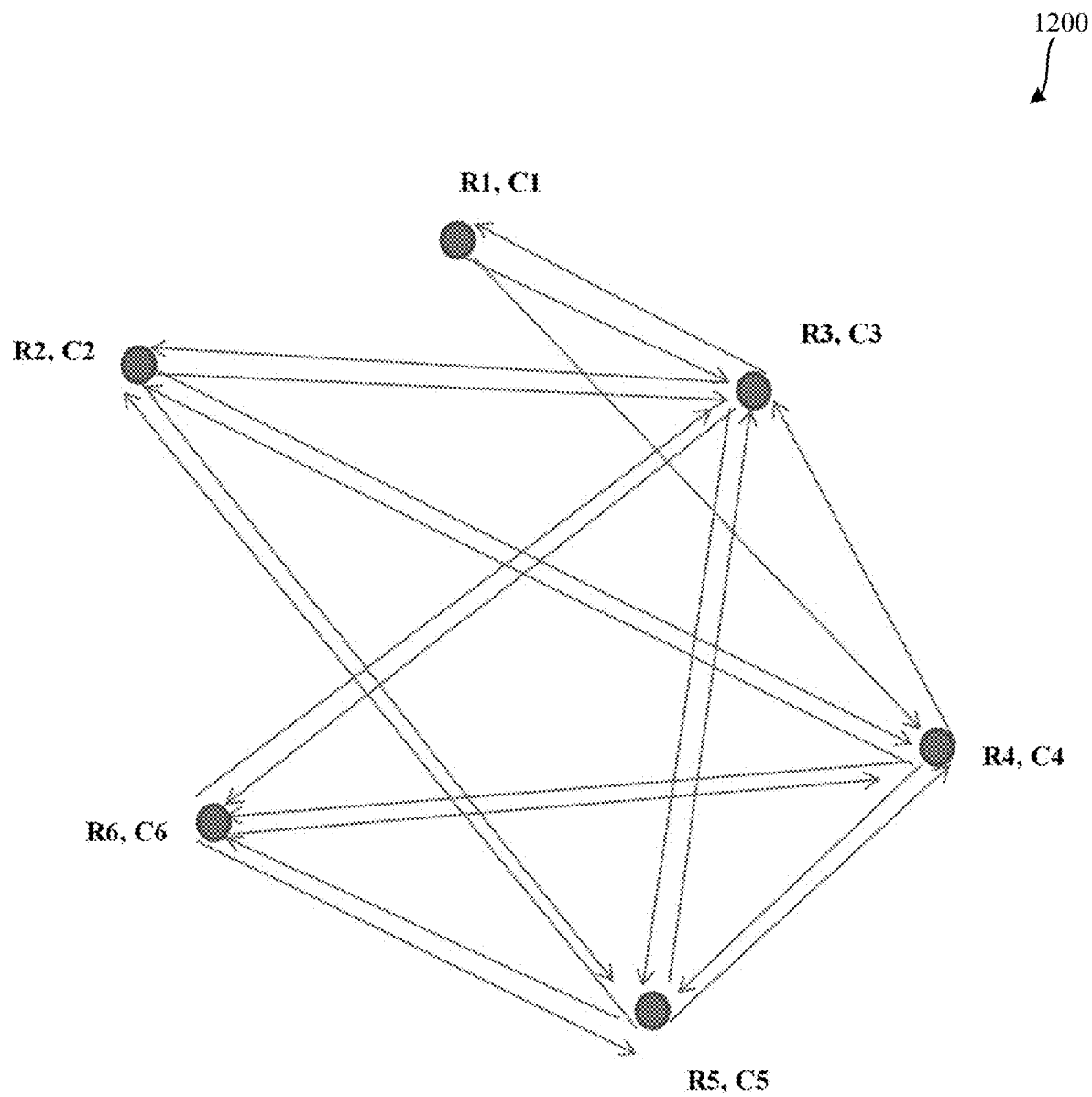
FIG. 12 illustrates an example graph representation of the encryption matrix of FIG. 11 in accordance with the teachings of this disclosure.

FIG. 12 illustrates an example graph representation 1200 of the encryption matrix 1100 of FIG. 11 in accordance with the teachings of this disclosure. For example, the graph representation 1200 includes six nodes equal to the number of columns of the encryption matrix 1100. The edges connecting the nodes are oriented in the direction to indicate the location of the one in the binary matrix. For example, for two nodes labelled R1, C1 and R3, C3, the edge pointing from R1, C1 to R3, C3 indicates the presence of a one at R1, C3. The example graph representation 1200 includes overlapping edge connections.

FIG. 13 illustrates an example data representation 1300 of the encryption matrix 1100 of FIG. 11 in accordance with the teachings of this disclosure. In the example data representation 1300, the values in the bracketed entries represent coordinate pairs of the encryption matrix 1100 at which one elements are located. The values one to six are indicators of the row of the encryption matrix 1100 at which the coordinate pairs are located.

Figure 14:
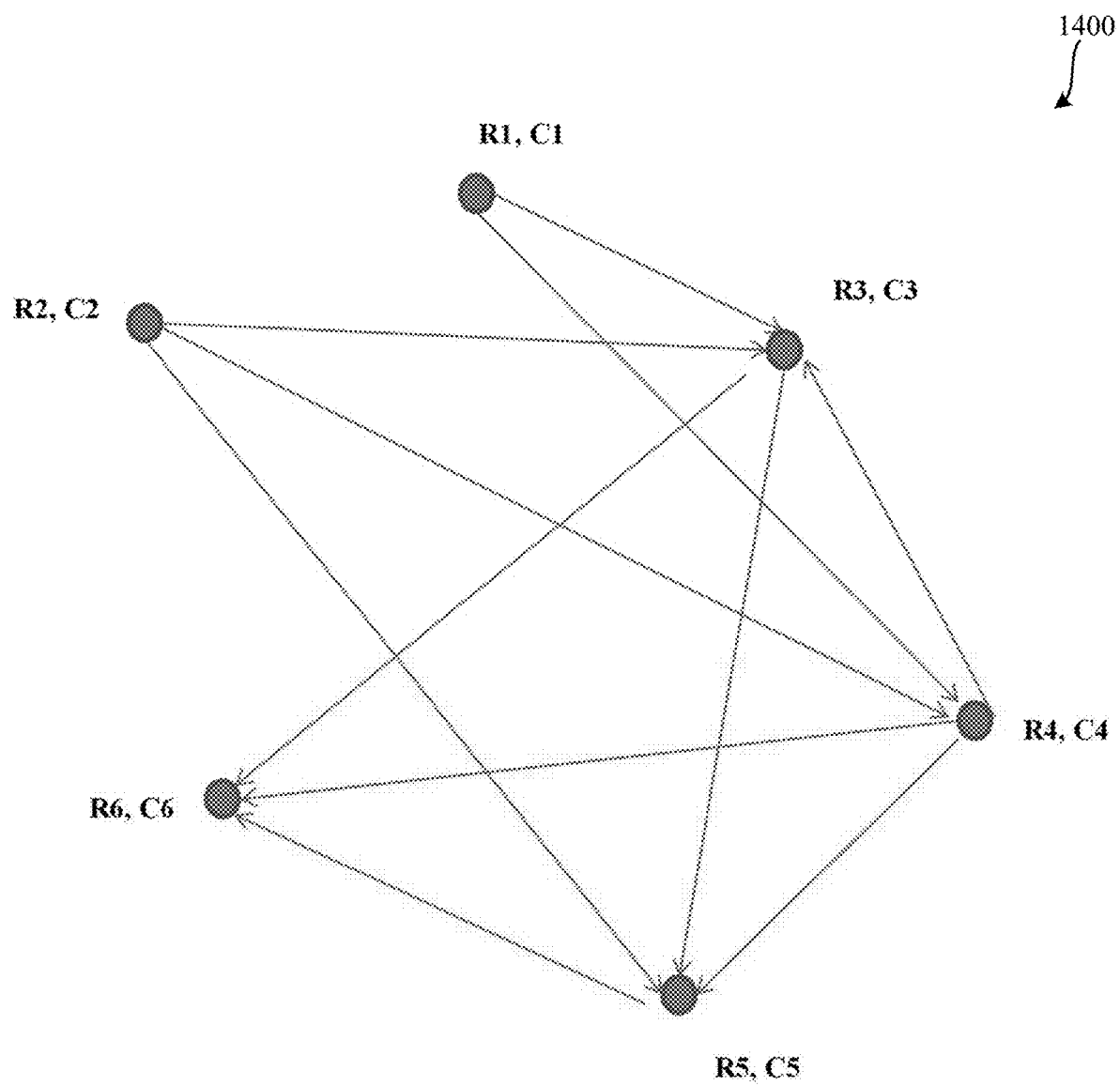
FIG. 14 illustrates an example graph representation of the encryption matrix of FIG. 11 with overlapping edge connections removed in accordance with the teachings of this disclosure.

FIG. 14 illustrates an example graph representation 1400 of the encryption matrix 1100 of FIG. 11 with overlapping edge connections removed in accordance with the teachings of this disclosure.

FIG. 15 illustrates an example data representation 1500 of the encryption matrix 1100 of FIG. 11 with overlapping edge connections removed in accordance with the teachings of this disclosure.

Figure 16:
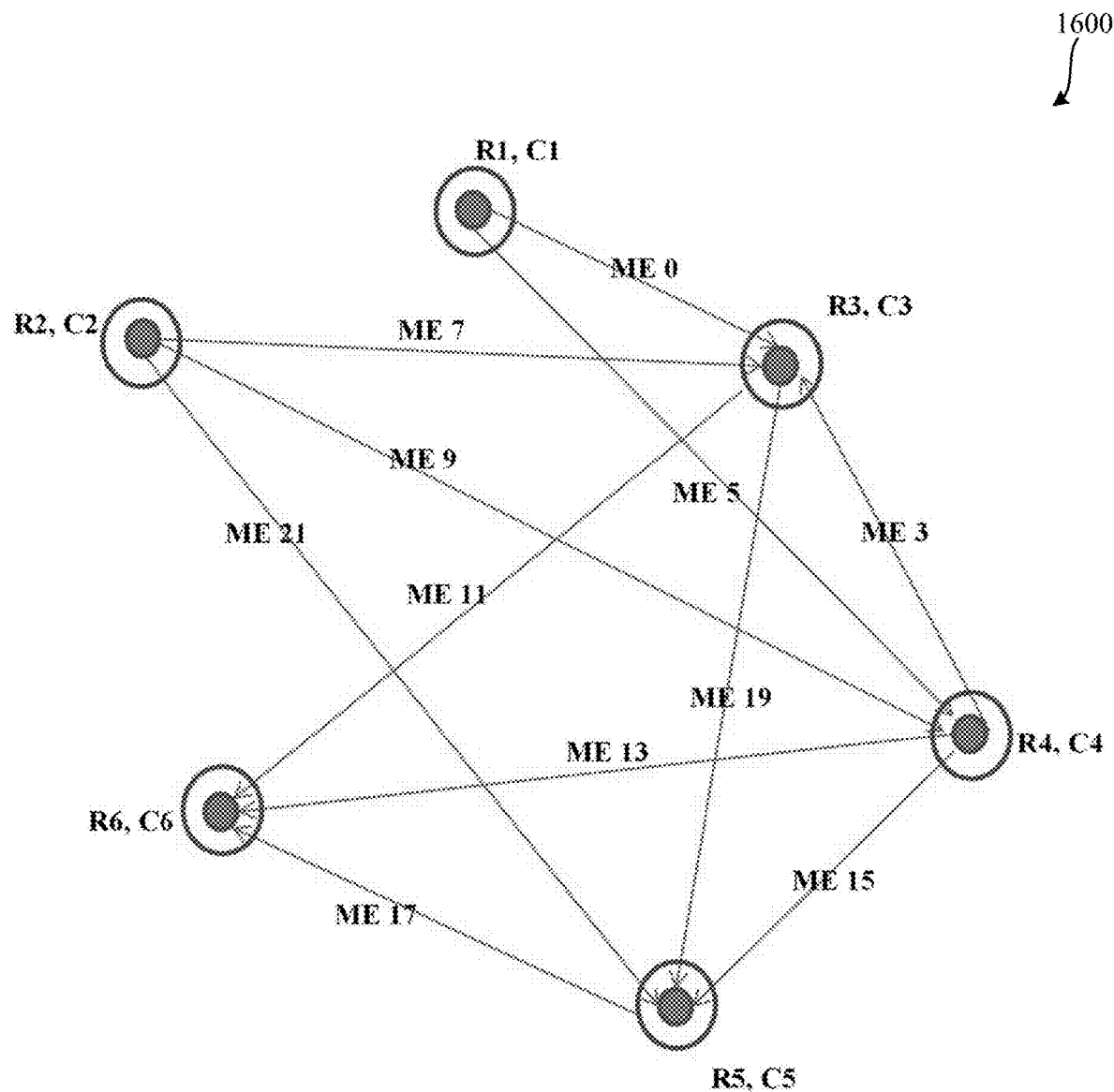
FIG. 16 illustrates an example graph representation of the encryption matrix of FIG. 11 with edge connections labelled in accordance with the teachings of this disclosure.

FIG. 16 illustrates an example graph representation 1600 of the encryption matrix 1100 of FIG. 11 with edge connections labelled in accordance with the teachings of this disclosure. The labels of the edge connections of the graph representation 1600 range from ME0 to ME 21.

Figures 17, 18:
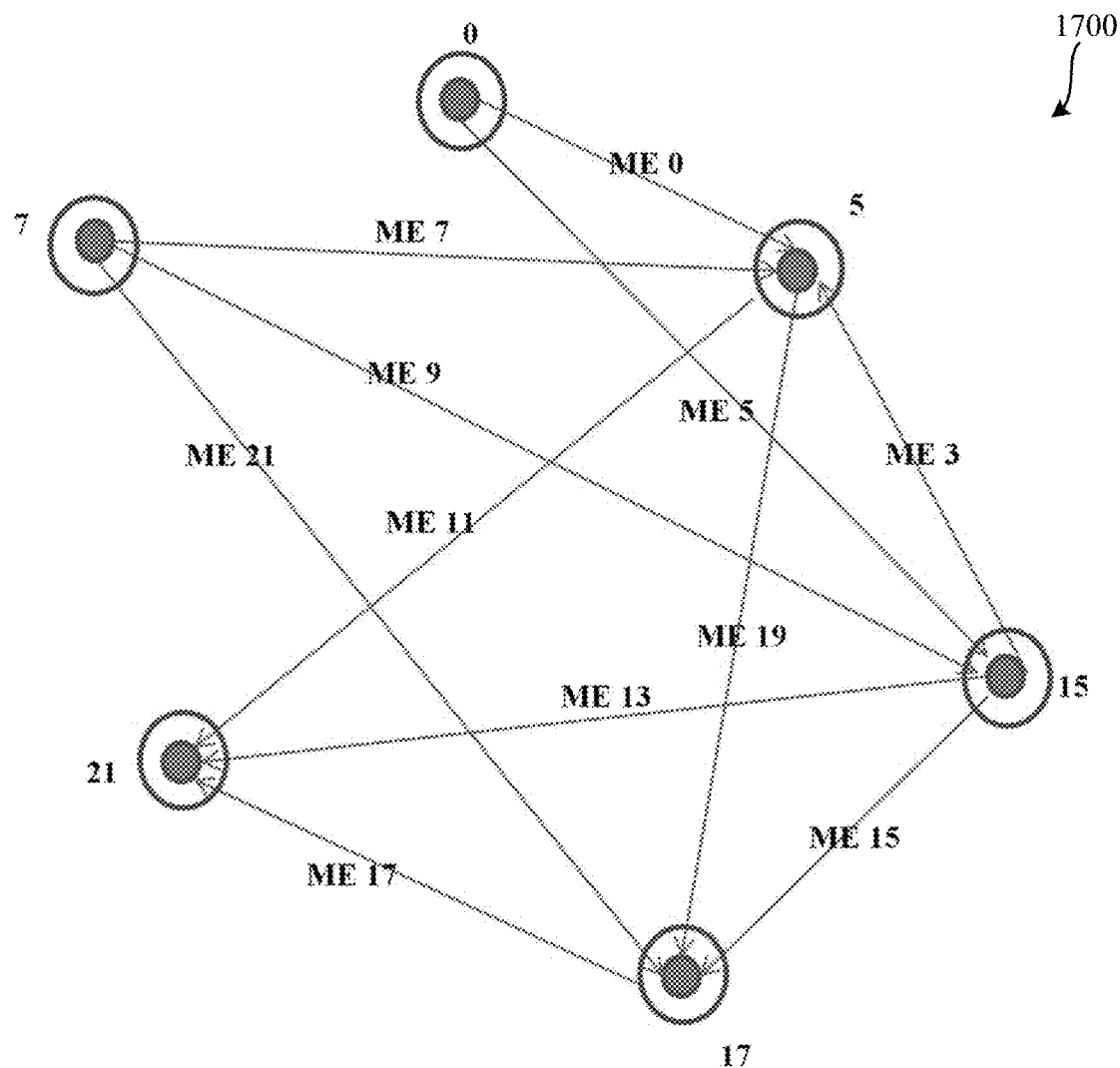
FIG. 17 illustrates an example graph representation of the encryption matrix of FIG. 11 with mesh nodes labelled in accordance with the teachings of this disclosure.
FIG. 18 illustrates an example encryption vector including encrypted values generated based on the mesh of FIGS. 12, 13, 14, 15, 16, and/or 17 in accordance with the teachings of this disclosure.

FIG. 17 illustrates an example graph representation 1700 of the encryption matrix of FIG. 11 with mesh nodes labelled in accordance with the teachings of this disclosure. The graph representation 1700 includes labelled nodes and labelled edge connections.

FIG. 18 illustrates an example encryption vector 1800 including encrypted values generated based on the mesh of FIGS. 12, 13, 14, 15, 16, and/or 17 in accordance with the teachings of this disclosure. The encryption vector 1800 includes the encrypted values 13, 95, 113, 7, 81, 203, 93, 17, 59, 127, and 113. The encrypted values represent pixel values to be encrypted into the input matrix 1000.

FIG. 19 illustrates an example encrypted input matrix 1900 in accordance with the teachings of this disclosure. For example, the encrypted input matrix 1900 is representative of the input matrix 1000 of FIG. 10 when encrypted with the encryption vector 1800 of FIG. 18 using the horizontal encryption technique. The bolded values [13, 95, 113, 7, 81, 203, 93, 17, 59, 127, 113] represent the encrypted values generated by the encrypted value controller 210 and encrypted into the input matrix (e.g., the input media 104) by the encryption controller 212 to generate encrypted media (e.g., the output encrypted media 108).

FIG. 20 illustrates an example encrypted input matrix 2000 in accordance with the teachings of this disclosure. For example, the encrypted input matrix 2000 is representative of the input matrix 1000 of FIG. 10 when encrypted with the encryption vector 1800 of FIG. 18 using the diagonal encryption technique. The bolded values [13, 95, 113, 7, 81, 203, 93, 17, 59, 127, 113] represent the encrypted values generated by the encrypted value controller 210 and encrypted into the input matrix (e.g., the input media 104) by the encryption controller 212 to generate encrypted media (e.g., the output encrypted media 108).

While an example manner of implementing the central facility 102 of FIG. 1 is illustrated in FIG. 2, one or more of the elements, processes and/or devices illustrated in FIG. 2 may be combined, divided, re-arranged, omitted, eliminated and/or implemented in any other way. Further, the example mesh generation controller 202, the example overlap controller 204, the example mesh edge controller 206, the edge labelling controller 208, the example encrypted value controller 210, the example encryption controller 212, the example data storage 214 and/or, more generally, the example 102 of FIG. 2 may be implemented by hardware, software, firmware and/or any combination of hardware, software and/or firmware. Thus, for example, any of the example mesh generation controller 202, the example overlap controller 204, the example mesh edge controller 206, the edge labelling controller 208, the example encrypted value controller 210, the example encryption controller 212, the example data storage 214 and/or, more generally, the example 102 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example mesh generation controller 202, the example overlap controller 204, the example mesh edge controller 206, the edge labelling controller 208, the example encrypted value controller 210, the example encryption controller 212, the example data storage 214 and/or, more generally, the example 102 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example central facility 102 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the central facility 102 of FIG. 1 are shown in FIGS. 21, 22, 23, 24, 25, 26, 27, and 28. The machine readable instructions may be one or more executable programs or portion(s) of an executable program for execution by a computer processor and/or processor circuitry, such as the processor 2912 shown in the example processor platform 2900 discussed below in connection with FIG. 29. The program may be embodied in software stored on a non-transitory computer readable storage medium such as a CD-ROM, a floppy disk, a hard drive, a DVD, a Blu-ray disk, or a memory associated with the processor 2912, but the entire program and/or parts thereof could alternatively be executed by a device other than the processor 2912 and/or embodied in firmware or dedicated hardware. Further, although the example program is described with reference to the flowcharts illustrated in FIGS. 21, 22, 23, 24, 25, 26, 27, and 28, many other methods of implementing the example central facility 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 21-28 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 21:
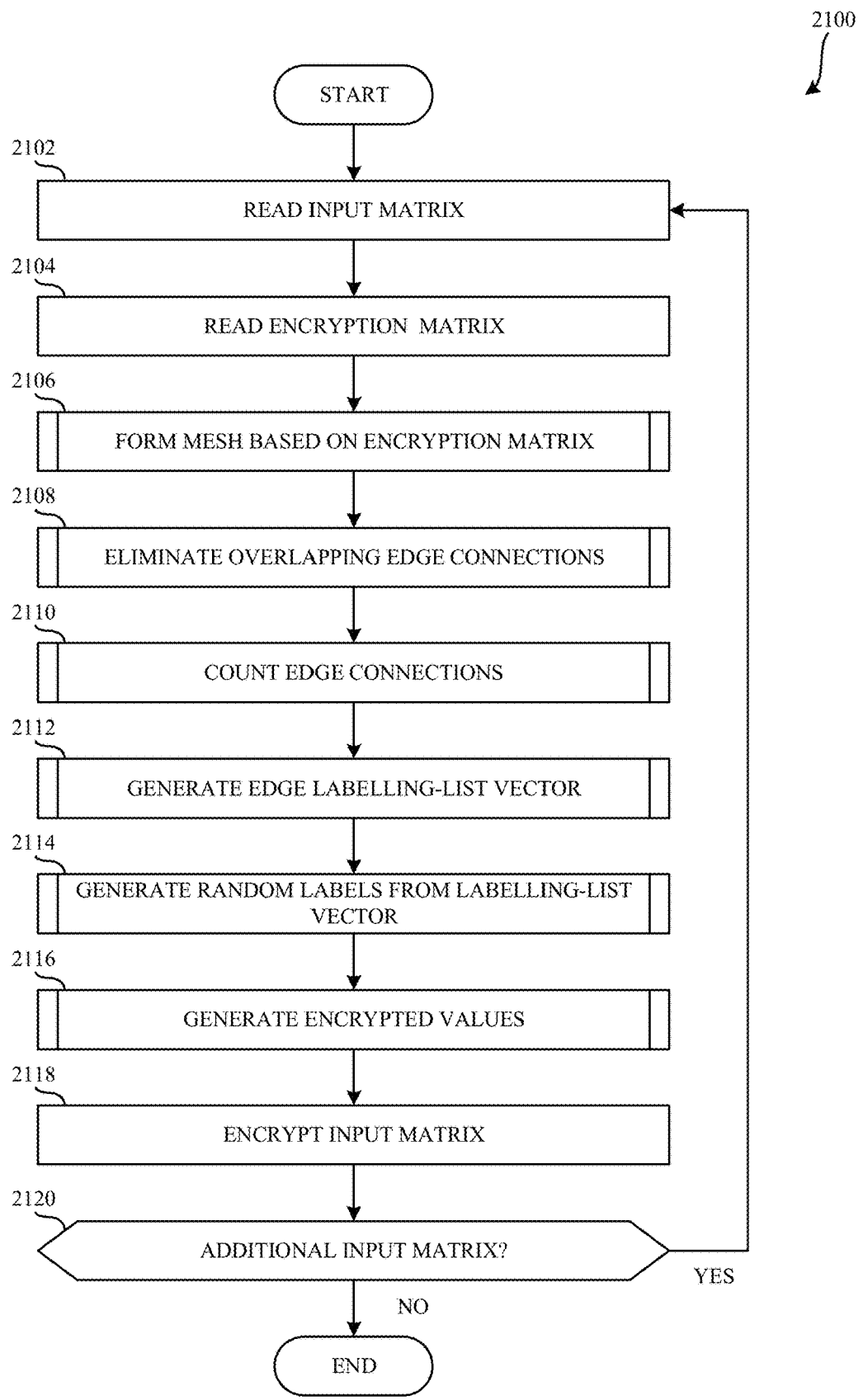
FIG. 21 is a flowchart representative of a process, which may be implemented utilizing machine-readable instructions that may be executed to implement the central facility of FIGS. 1 and/or 2 to encrypt media for identification.

FIG. 21 is a flowchart representative of a process 2100, which may be implemented utilizing machine-readable instructions that may be executed to implement the central facility 102 of FIGS. 1 and/or 2 to encrypt media for identification. The process 2100 begins at block 2102 where the mesh generation controller 202 reads an input matrix. At block 2104, the mesh generation controller 202 reads an encryption matrix. At block 2106, the mesh generation controller 202 forms a mesh based on the encryption matrix. An example detailed process to form a mesh based on the encryption matrix is illustrated and described in connection with FIG. 22.

In the illustrated example of FIG. 21, at block 2108, the overlap controller 204 eliminates overlapping edge connections. An example detailed process to eliminate overlapping edge connections is illustrated and described in connection with FIG. 23. At block 2110, the mesh edge controller 206 counts the edge connections in the mesh. An example detailed process to count the edge connections in the mesh is illustrated and described in connection with FIG. 24. At block 2112, the edge labelling controller 208 generates an edge labelling-list vector. An example detailed process to generate an edge labelling-list vector is illustrated and described in connection with FIG. 25.

In the illustrated example of FIG. 21, at block 2114, the edge labelling controller 208 generates random labels from the labelling-list vector. An example detailed process to generate random labels from the labelling-list vector is illustrated and described in connection with FIG. 26. At block 2116, the encrypted value controller 210 generates encrypted values based on the labels. An example detailed process to generate encrypted values based on the labels is illustrated and described in connection with FIG. 27. At block 2118, the encryption controller 212 encrypts the input matrix with the encrypted values.

In the illustrated example of FIG. 21, at block 2120, the mesh generation controller 202 determines whether there are additional input matrices. If the mesh generation controller 202 determines that there are additional input matrices (block 2120: YES), the process 2100 returns to block 2102. If the mesh generation controller 202 determines that there are not additional input matrices (block 2120: NO), the process 2100 terminates.

Figure 22:
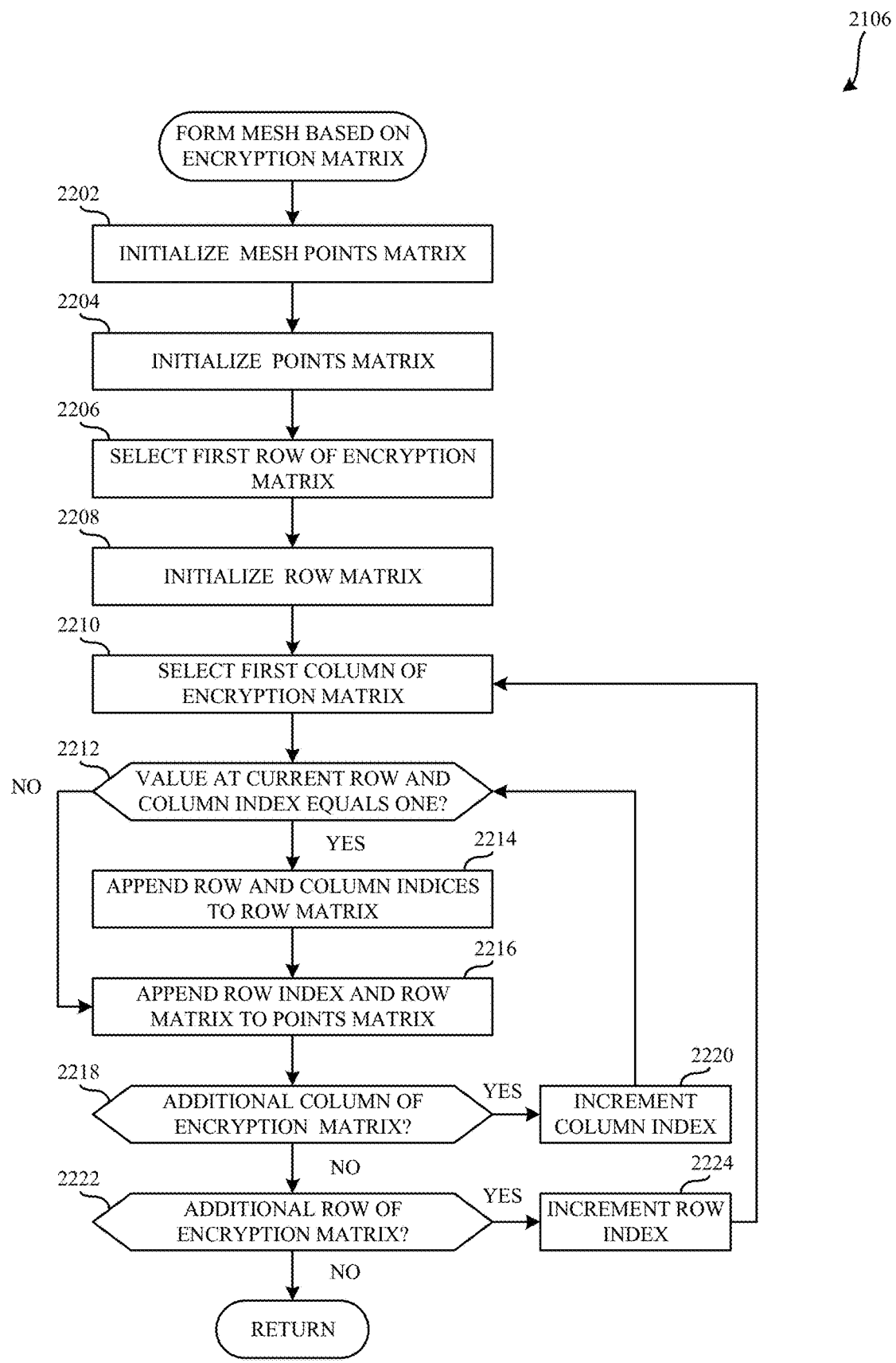
FIG. 22 is a flowchart representative of a process, which may be implemented utilizing machine-readable instructions that may be executed to implement the central facility of FIGS. 1 and/or 2 to form a mesh based on an encryption matrix.

FIG. 22 is a flowchart representative of a process 2106, which may be implemented utilizing machine-readable instructions that may be executed to implement the central facility 102 of FIGS. 1 and 2 to form a mesh based on an encryption matrix. The process 2106 begins at block 2202 where the mesh generation controller 202 initializes a Mesh Points matrix. At block 2204, the mesh generation controller 202 initializes a Points matrix.

In the illustrated example of FIG. 22, at block 2206, the mesh generation controller 202 selects a first row of the encryption matrix. At block 2208, the mesh generation controller 202 initializes a row matrix for the first row of the encryption matrix. At block 2210, the mesh generation controller 202 selects a first column of the encryption matrix for the selected row. At block 2212, the mesh generation controller 202 determines whether the value at the first column of the first row of the encryption matrix equals one. If the mesh generation controller 202 determines that the value at the first column of the first row of the encryption matrix (e.g., R1, C1) equals one (block 2212: YES), the mesh generation controller 202 appends the row index and the column index to the row matrix at block 2214. If the mesh generation controller 202 determines that the value at the first column of the first row of the encryption matrix (e.g., R1, C1) does not equal one (block 2212: NO), the mesh generation controller 202 appends the row index and the row matrix to the Points matrix at block 2216.

In the illustrated example of FIG. 22, at block 2218, the mesh generation controller 202 determines whether there are additional columns of the encryption matrix. If the mesh generation controller 202 determines that there are additional columns of the encryption matrix (block 2218: YES), the mesh generation controller 202 increments the column index at block 2220. After block 2220, the process 2106 returns to block 2212.

In the illustrated example of FIG. 22, if the mesh generation controller 202 determines that there are not additional columns of the encryption matrix (block 2218: NO), the mesh generation controller 202 determines whether there are additional rows of the encryption matrix at block 2222. If the mesh generation controller 202 determines that there are additional rows of the encryption matrix (block 2222: YES), the mesh generation controller 202 increments the row index at block 2224. After block 2224, the process 2106 returns to block 2210. If the mesh generation controller 202 determines that there are not additional rows of the encryption matrix (block 2222: NO), the process 2106 returns to the process 2100 at block 2108.

Figure 23:
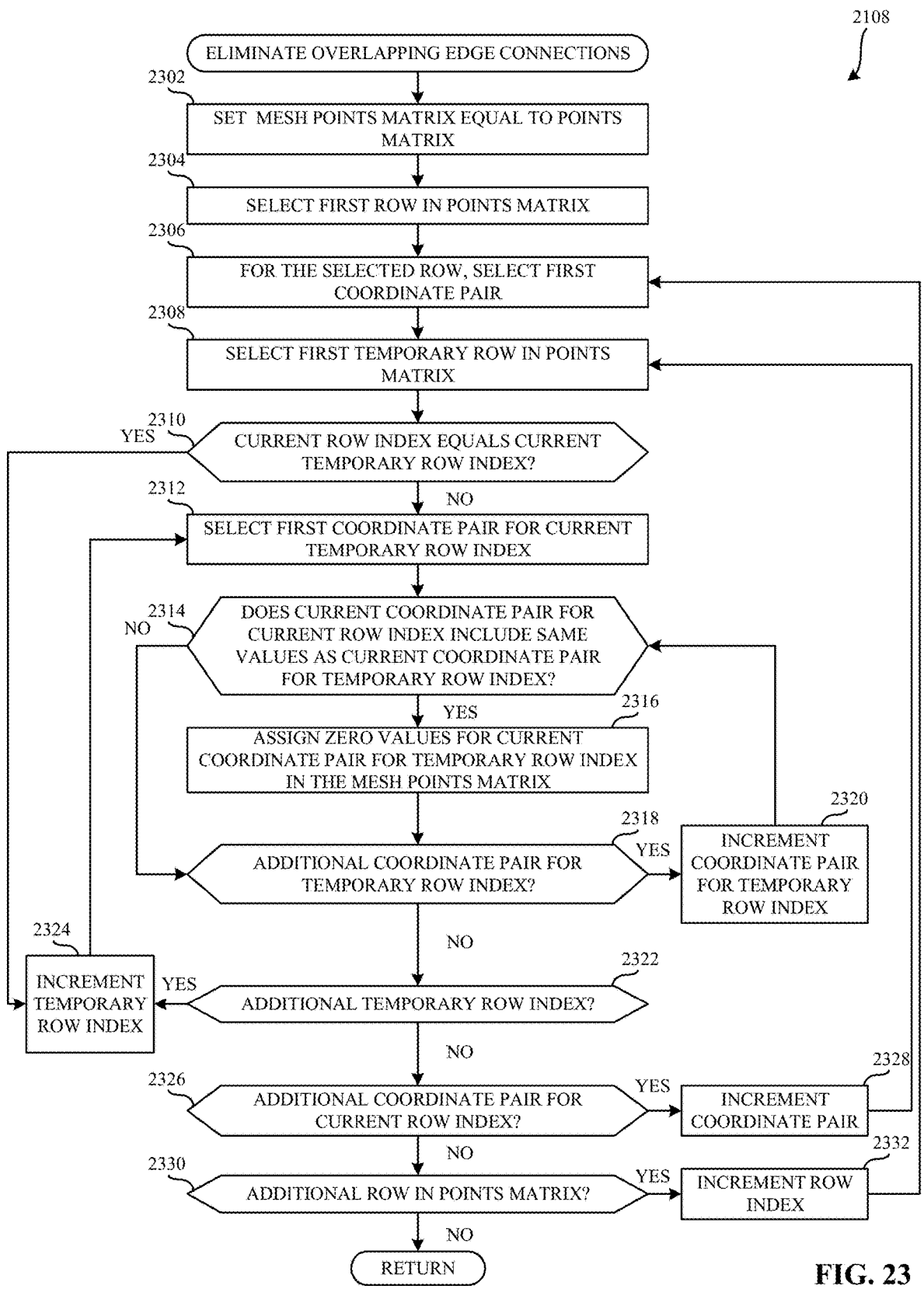
FIG. 23 is a flowchart representative of a process, which may be implemented utilizing machine-readable instructions that may be executed to implement the central facility of FIGS. 1 and/or 2 to eliminate overlapping edge connections in the mesh generated when executing the example process of FIG. 22.

FIG. 23 is a flowchart representative of a process 2108, which may be implemented utilizing machine-readable instructions that may be executed to implement the central facility 102 of FIGS. 1 and 2 to eliminate overlapping edge connections in the mesh generated when executing the example process 2106 of FIG. 22. The process 2108 begins at block 2302 where the overlap controller 204 sets the Mesh Points matrix equal to the Points matrix. At block 2304, the overlap controller 204 selects the first row of the Points matrix.

In the illustrated example of FIG. 23, at block 2306, for the selected row, the overlap controller 204 selects the first coordinate pair. At block 2308, the overlap controller 204 selects an additional row in the Points matrix as a temporary row. At block 2310, the overlap controller 204 determines whether the current row index equal the current temporary row index. If the overlap controller 204 determines that the current row index is equal to the current temporary row index (block 2310: YES), the process 2108 proceeds to block 2324. If the overlap controller 204 determines that the current row index is not equal to the current temporary row index (block 2310: NO), the overlap controller 204 selects the first coordinate pair for the first temporary row index at block 2312.

In the illustrated example of FIG. 23, at block 2314, the overlap controller 204 determines whether the current coordinate pair for the current row index includes the same values as the current coordinate pair for the temporary row index. If the overlap controller 204 determines that the current coordinate pair for the current row index includes the same values as the current coordinate pair for the temporary row index (block 2314: YES), the overlap controller 204 assigns zero values for the current coordinate pair for the temporary row index in the Mesh Points matrix at block 2316. For example, if the current coordinate pair for the current row index in the Points matrix is R1, C3 and the current coordinate pair for the temporary row index in the Points matrix is R3, C1, the overlap controller 204 sets zero values at R3, C1 in the Mesh Points matrix. If the overlap controller 204 determines that the current coordinate pair for the current row index does not include the same values as the current coordinate pair for the temporary row index (block 2314: NO), the overlap controller 204 determines whether there are additional coordinate pairs for the current temporary row index at block 2318.

In the illustrated example of FIG. 23, if the overlap controller 204 determines that there are additional coordinate pairs for the current temporary row index (block 2318: YES), the overlap controller 204 increments the coordinate pair for the current temporary row index at block 2320. After block 2320, the process 2108 returns to block 2314. If the overlap controller 204 determines that there are not additional coordinate pairs for the current temporary row index (block 2318: NO), the overlap controller 204 determines whether there are additional temporary row indices at block 2322. If the overlap controller 204 determines that there are additional temporary row indices (block 2322: YES), the overlap controller 204 increments the temporary row index at block 2324. After block 2324, the process 2108 returns to block 2312.

In the illustrated example of FIG. 23, if the overlap controller 204 determines that there are not additional temporary row indices (block 2322: NO), the overlap controller 204 determines whether there are additional coordinate pairs for the current row index at block 2326. If the overlap controller 204 determines that there are additional coordinate pairs for the current row index (block 2326: YES), the overlap controller 204 increments the coordinate pair for the current row index at block 2328. After block 2328, the process 2108 returns to block 2308.

In the illustrated example of FIG. 23, if the overlap controller 204 determines that there are not additional coordinate pairs for the current row index (block 2326: NO), the overlap controller 204 determines whether there are additional rows in the Points matrix at block 2330. If the overlap controller 204 determines that there are additional rows in the Points matrix (block 2330: YES), the overlap controller 204 increments the row index at block 2332. After block 2332, the process 2108 returns to block 2306. If the overlap controller 204 determines that there are not additional rows in the Points matrix (block 2330: NO), the process 2108 returns to the process 2100 at block 2110.

Figure 24:
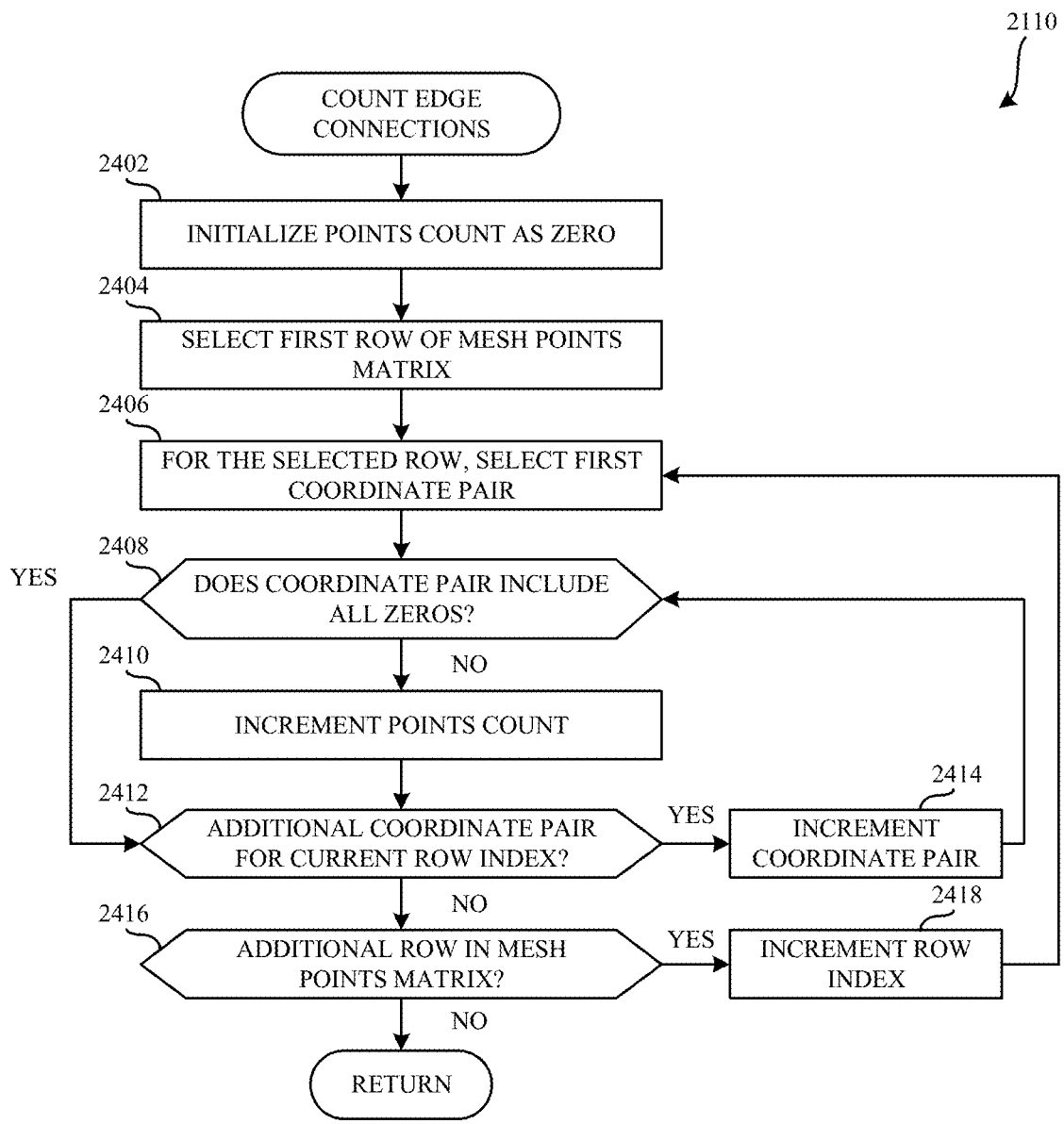
FIG. 24 is a flowchart representative of a process, which may be implemented utilizing machine-readable instructions that may be executed to implement the central facility of FIGS. 1 and/or 2 to count edge connections in the mesh generated when executing the example processes of FIGS. 22 and/or 23.

FIG. 24 is a flowchart representative of a process 2110, which may be implemented utilizing machine-readable instructions that may be executed to implement the central facility 102 of FIGS. 1 and 2 to count edge connections in the mesh generated when executing the example processes of FIGS. 22 and/or 23. The process 2110 begins at block 2402 where the mesh edge controller 206 initializes a Points Count as zero. At block 2404, the mesh edge controller 206 selects the first row of the Mesh Points matrix. At block 2406, for the selected row, the mesh edge controller 206 selects the first coordinate pair.

In the illustrated example of FIG. 24, at block 2408, the mesh edge controller 206 determines whether the coordinate pair includes all zero values. If the mesh edge controller 206 determines that the coordinate pair does not include all zero values (block 2408: NO), the mesh edge controller 206 increments the Points Count at block 2410. If the mesh edge controller 206 determines that the coordinate pair includes all zero values (block 2408: YES), the mesh edge controller 206 determines whether there are additional coordinate pairs for the current row index at block 2412.

In the illustrated example of FIG. 24, if the mesh edge controller 206 determines that there are additional coordinate pairs for the current row index (block 2412: YES), the mesh edge controller 206 increments the current coordinate pair at block 2414. After block 2414, the process 2110 returns to block 2408. If the mesh edge controller 206 determines there are not additional coordinate pairs for the current row index (block 2412: NO), the mesh edge controller 206 determines whether there are additional rows in the Mesh Points matrix at block 2416. If the mesh edge controller 206 determines that there are additional rows in the Mesh Points matrix (block 2416: YES), the mesh edge controller 206 increments the current row index at block 2418. After block 2418, the process 2110 returns to block 2406. If the mesh edge controller 206 determines that there are not additional rows in the Mesh Points matrix (block 2416: NO), the process 2110 returns to the process 2100 at block 2112.

Figure 25:
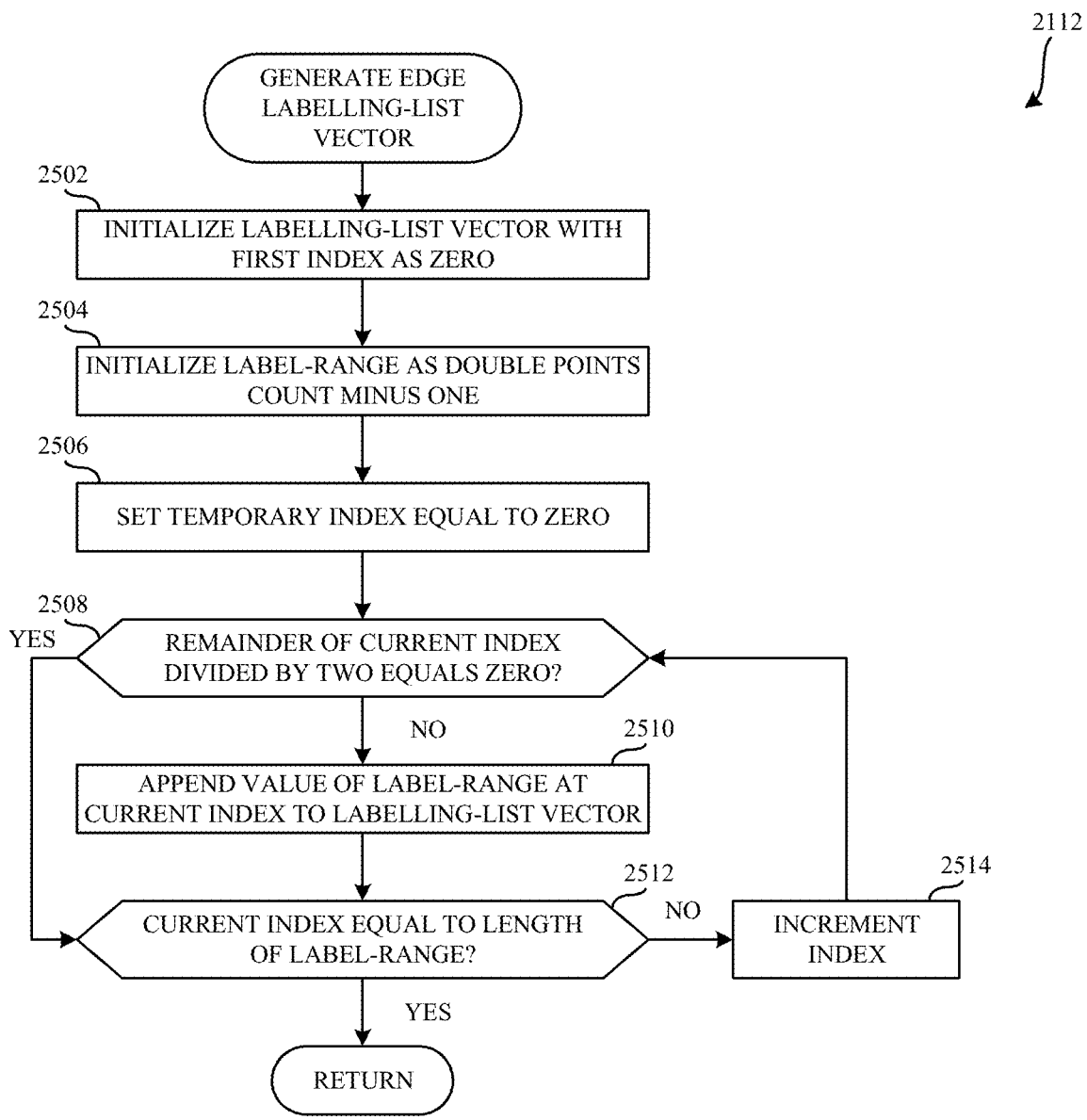
FIG. 25 is a flowchart representative of a process, which may be implemented utilizing machine-readable instructions that may be executed to implement the central facility of FIGS. 1 and/or 2 to generate an edge labelling list for the edge connections in the mesh generated when executing the example processes of FIGS. 22, 23, and/or 24.

FIG. 25 is a flowchart representative of a process 2112, which may be implemented utilizing machine-readable instructions that may be executed to implement the central facility 102 of FIGS. 1 and 2 to generate an edge labelling list for the edge connections in the mesh generated when executing the example processes of FIGS. 22, 23, and/or 24. The process 2112 begins at block 2502 where the edge labelling controller 208 initializes the labelling-list vector with zero as the first index. At block 2504, the edge labelling controller 208 initializes a label-range variable as two times the value of Points Count minus one. At block 2506, the edge labelling controller 208 sets a temporary index equal to zero.

In the illustrated example of FIG. 25, at block 2508, the edge labelling controller 208 determines whether the remainder of the current index divided by two equal zero. If the edge labelling controller 208 determines that the remainder of the current index divided by two does not equal zero (block 2508: NO), the edge labelling controller 208 appends the value of label range at the current index to the labelling list vector at block 2510. If the edge labelling controller 208 determines that the remainder of the current index divided by two does equal zero (block 2508: YES), the process 2112 proceeds to block 2512 where the edge labelling controller 208 determines whether the current index is equal to the length of the label range variable when listed. If the edge labelling controller 208 determines that the current index is not equal to the length of the label range variable when listed (block 2512: NO), the edge labelling controller 208 increments the temporary index at block 2514. After block 2514, the process 2112 returns to block 2508. If the edge labelling controller 208 determines that the current index is equal to the length of the label range variable when listed (block 2512: YES), the process 2112 returns to the process 2100 at block 2114.

Figure 26:
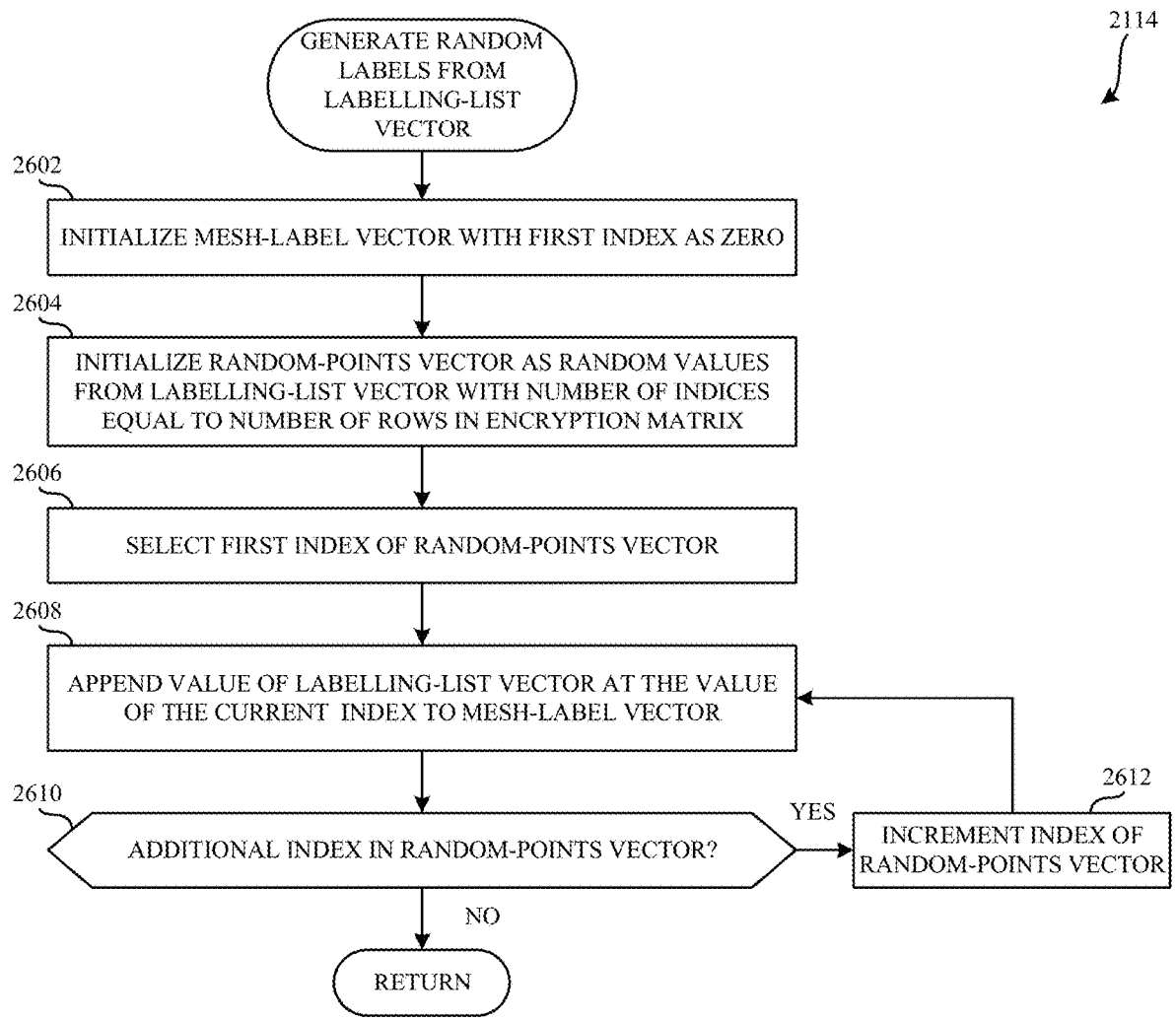
FIG. 26 is a flowchart representative of a process, which may be implemented utilizing machine-readable instructions that may be executed to implement the central facility of FIGS. 1 and 2 to generate random labels from the labelling list for the edge connections in the mesh generated when executing the example processes of FIGS. 22, 23, 24, and/or 25.

FIG. 26 is a flowchart representative of a process 2114, which may be implemented utilizing machine-readable instructions that may be executed to implement the central facility 102 of FIGS. 1 and 2 to generate random labels from the labelling list for the edge connections in the mesh generated when executing the example processes of FIGS. 22, 23, 24, and/or 25. The process 2114 begins at block 2602 where the edge labelling controller 208 initializes a mesh-label vector with the first index as zero. At block 2604, the edge labelling controller 208 initializes a random-points vector as random values from the labelling-list vector. The number of indices of the random-points vector is equal to the number of rows in the encryption matrix. At block 2606, the edge labelling controller 208 selects the first index of the random-points vector and appends the value of the labelling-list vector at the value of the current index to the mesh-label vector.

In the illustrated example of FIG. 26, at block 2610, the edge labelling controller 208 determines whether there are additional indices in the random-points vector. If the edge labelling controller 208 determines that there are additional indices in the random-points vector (block 2610: YES), the edge labelling controller 208 increments the index of the random-points vector at block 2612. After block 2612, the process 2114 returns to block 2608. If the edge labelling controller 208 determines that there are not additional indices in the random-points vector (block 2610: NO), the process 2114 returns to the process 2100 at block 2116.

Figure 27:
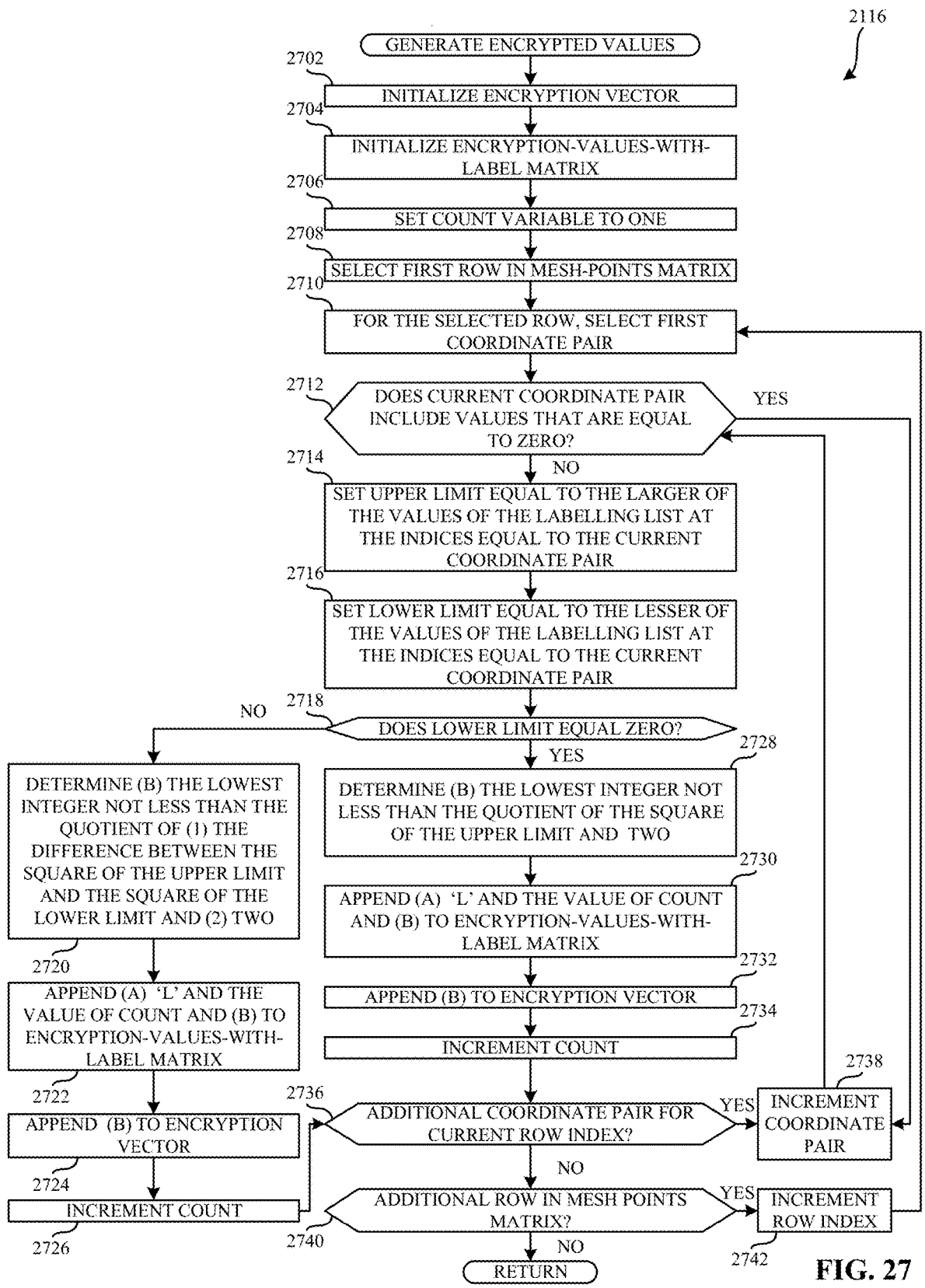
FIG. 27 is a flowchart representative of a process, which may be implemented utilizing machine-readable instructions that may be executed to implement the central facility of FIGS. 1 and 2 to generate encrypted values for the input matrix based on the mesh generated when executing the example processes of FIGS. 22, 23, 24, 25, and/or 26.

FIG. 27 is a flowchart representative of a process 2116, which may be implemented utilizing machine-readable instructions that may be executed to implement the central facility 102 of FIGS. 1 and 2 to generate encrypted values for the input matrix based on the mesh generated when executing the example processes of FIGS. 22, 23, 24, 25, and/or 26. The process 2116 begins at block 2702 where the encrypted value controller 210 initializes an encryption vector (e.g., a pixel value vector). At block 2704, the encrypted value controller 210 initializes an encryption values with label matrix. At block 2706, the encrypted value controller 210 sets a count variable to one. At block 2708, the encrypted value controller 210 selects the first row in the Mesh Points matrix. At block 2710, for the selected row, the encrypted value controller 210 selects the first coordinate pair.

In the illustrated example of FIG. 27, at block 2712, the encrypted value controller 210 determines whether the current coordinate pair includes all zero values. If the encrypted value controller 210 determines that the current coordinate pair includes all zero values (block 2712: YES), the process 2116 proceeds to block 2738. If the encrypted value controller 210 determines that the current coordinate pair does not include all zero values (block 2712: NO), the process 2116 proceeds to block 2714. At block 2714, the encrypted value controller 210 sets an upper limit equal to the larger of the values of the labelling list at the indices equal to the current coordinate pair. At block 2716, the encrypted value controller 210 sets a lower limit equal to the lesser of the values of the labelling list at the indices equal to the current coordinate pair. In examples disclosed herein, the upper limit and lower limit correspond to the nodes connected to the edge associated with the current coordinate pair.

In the illustrated example of FIG. 27, at block 2718, the encrypted value controller 210 determines whether the lower limit is equal to zero. If the encrypted value controller 210 determines that the lower limit is not equal to zero (block 2718: NO), the process 2116 proceeds to block 2720 where the encrypted value controller 210 determines (B) as the lowest integer not less than the quotient of (1) the difference between the square of the upper limit and the square of the lower limit and (2) two. At block 2722, the encrypted value controller 210 appends (A) the character 'L' and the value of count and (B) to the encryption values with label matrix. At block 2724, the encrypted value controller 210 appends (B) to the encryption vector and increments the count. At block 2726, the encrypted value controller 210 determines whether there are additional coordinate pairs for the current row index. After block 2726, the process 2116 proceeds to block 2736.

In the illustrated example of FIG. 27, returning to block 2718, if the encrypted value controller 210 determines that the lower limit is not equal to zero (block 2718: YES), the process 2116 proceeds to block 2728 where the encrypted value controller 210 determines (B) as the lowest integer not less than the quotient of the square of the upper limit and two. At block 2730, the encrypted value controller 210 appends (A) the character "L" and the value of count and (B) to the encryption values with label matrix. At block 2732, the encrypted value controller 210 appends (B) to the encryption vector. At block 2734, the encrypted value controller 210 increments the count. At block 2736, the encrypted value controller 210 determines whether there are additional coordinate pairs for the current row index.

In the illustrated example of FIG. 27, if the encrypted value controller 210 determines that there are additional coordinate pairs for current row index (block 2736: YES), the encrypted value controller 210 increments the current coordinate pair at block 2738. After block 2738, the process 2116 returns to block 2712. If the encrypted value controller 210 determines that there are not additional coordinate pairs for current row index (block 2736: NO), the encrypted value controller 210 determines whether there are additional rows in the Mesh Points matrix at block 2740. If the encrypted value controller 210 determines that there are additional points in the Mesh Points matrix (block 2740: YES), the encrypted value controller 210 increments the current row index at block 2742. After block 2742, the process 2116 returns to block 2710. If the encrypted value controller 210 determines that there are not additional points in the Mesh Points matrix (block 2740: NO), the process 2116 returns to the process 2100 at block 2118.

Figure 28:
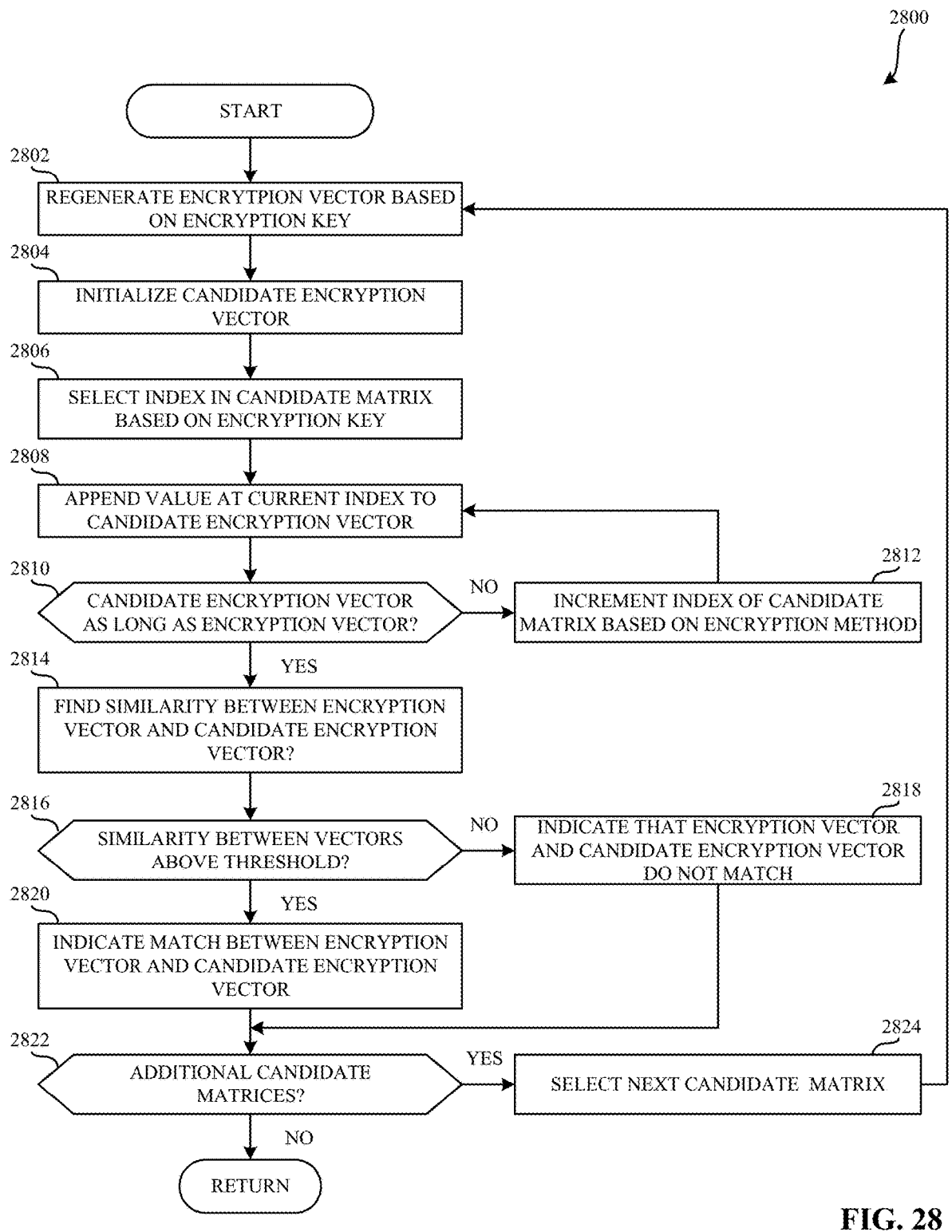
FIG. 28 is a flowchart representative of a process, which may be implemented utilizing machine-readable instructions that may be executed to implement the central facility of FIGS. 1 and 2 to reconstruct the encryption matrix.

FIG. 28 is a flowchart representative of a process 2800, which may be implemented utilizing machine-readable instructions that may be executed to implement the central facility 102 of FIGS. 1 and 2 to reconstruct the encryption matrix. The example process 2800 begins at block 2802 where the encrypted value controller 210 regenerates the encryption vector (e.g., the pixel value vector) based on the encryption key. At block 2804, the encrypted value controller 210 initializes the candidate encryption vector for a candidate input media (e.g., image data) being evaluated at the central facility 102.

In the illustrated example of FIG. 28, at block 2806, the encrypted value controller 210 selects an index in the candidate input matrix based on the encryption key. For example, the encrypted value controller 210 selects the index at which the encryption vector was encrypted in the original input matrix. At block 2808, the encrypted value controller 210 appends the value at the current index to the candidate encryption vector. At block 2810, the encrypted value controller 210 determines whether the candidate encryption vector is as long as the candidate encryption vector.

In the illustrated example of FIG. 28, if the encrypted value controller 210 determines that the candidate encryption vector is not as long as the encryption vector (block 2810: NO), the encrypted value controller 210 increments the index of the candidate input matrix based on the encryption key (e.g., based on the technique of encryption) at block 2812. After block 2812, the process 2800 returns to block 2808. If the encrypted value controller 210 determines that the candidate encryption vector is as long as the encryption vector (block 2810: YES), the process 2800 proceeds to block 2814. At block 2814, the encryption controller 212 determines the similarity between encryption vectors and candidate encryption vectors. For example, the encryption controller 212 can determine the Euclidian distance between the vectors, the Manhattan distance between the vectors, the Minkowski distance between the vectors, the cosine similarity of the vectors, and/or the Jaccard similarity of the vectors. At block 2816, the encryption controller 212 determines whether the similarity between the vectors is above a threshold (e.g., 75%, 95%, etc.). If the encryption controller 212 determines that the similarity between the vectors is below the threshold (block 2816: NO), the encryption controller 212 indicates that the candidate encryption vector does not match the encryption vector at block 2818. After block 2818, the process 2800 proceeds to block 2822. If the encryption controller 212 determines that the similarity between the vectors is at or above the threshold (block 2816: YES), the encryption controller 212 indicates that the candidate encryption vector matches the encryption vector at block 2820.

In the illustrated example of FIG. 28, at block 2822, the encrypted value controller 210 determines whether there are additional candidate input matrices. If the encrypted value controller 210 determines that there are additional candidate input matrices (block 2822: YES), the encrypted value controller 210 selects the next candidate input matrix at block 2824. After block 2824, the process 2800 returns to block 2802. If the encrypted value controller 210 determines that there are not additional candidate input matrices (block 2822: NO), the process 2800 terminates.

Figure 29:
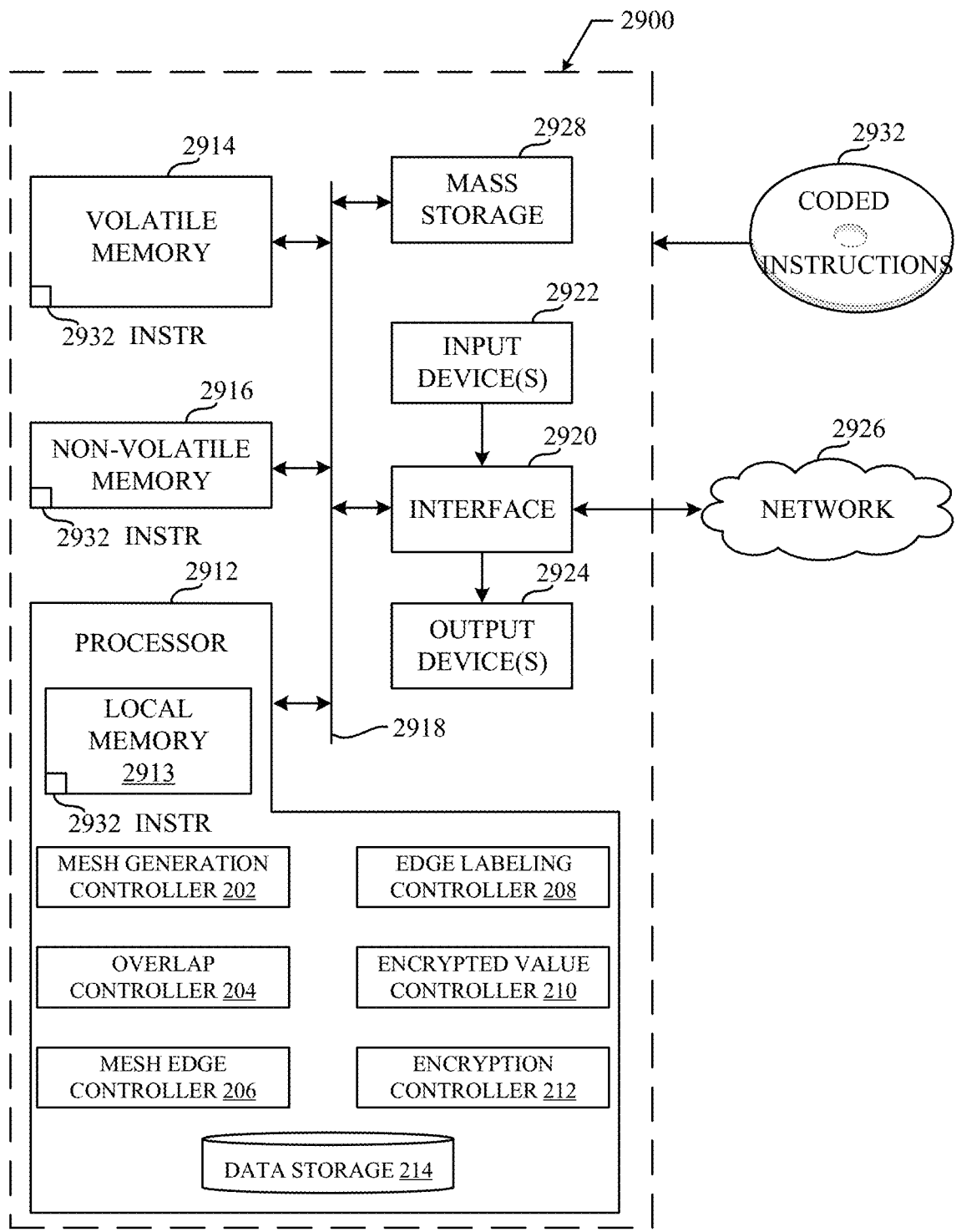
FIG. 29 is a block diagram of an example processing platform structured to execute the instructions of FIGS. 21, 22, 23, 24, 25, 26, 27, and/or 28 to implement the example central facility of FIGS. 1 and/or 2.

FIG. 29 is a block diagram of an example processing platform 2900 structured to execute the instructions of FIGS. 21, 22, 23, 24, 25, 26, 27, and/or 28 to implement the example central facility 102 of FIGS. 1 and 2. The processor platform 2900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 2900 of the illustrated example includes a processor 2912. The processor 2912 of the illustrated example is hardware. For example, the processor 2912 can be implemented by one or more integrated circuits, logic circuits, microprocessors, GPUs, DSPs, or controllers from any desired family or manufacturer. The hardware processor 2912 may be a semiconductor based (e.g., silicon based) device. In this example, the processor 2912 implements the example mesh generation controller 202, the example overlap controller 204, the example mesh edge controller 206, the edge labelling controller 208, the example encrypted value controller 210, the example encryption controller 212, the example data storage 214.

The processor 2912 of the illustrated example includes a local memory 2913 (e.g., a cache). The processor 2912 of the illustrated example is in communication with a main memory including a volatile memory 2914 and a non-volatile memory 2916 via a bus 2918. The volatile memory 2914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 2916 may be implemented by flash memory and/or any other desired type of memory device. Access to the main memory 2914, 2916 is controlled by a memory controller.

The processor platform 2900 of the illustrated example also includes an interface circuit 2920. The interface circuit 2920 may be implemented by any type of interface standard, such as an Ethernet interface, a universal serial bus (USB), a Bluetooth® interface, a near field communication (NFC) interface, and/or a PCI express interface.

In the illustrated example, one or more input devices 2922 are connected to the interface circuit 2920. The input device(s) 2922 permit(s) a user to enter data and/or commands into the processor 2912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 2924 are also connected to the interface circuit 2920 of the illustrated example. The output devices 2924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 2920 of the illustrated example, thus, typically includes a graphics driver card, a graphics driver chip and/or a graphics driver processor.

The interface circuit 2920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 2926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 2900 of the illustrated example also includes one or more mass storage devices 2928 for storing software and/or data. Examples of such mass storage devices 2928 include floppy disk drives, hard drive disks, compact disk drives, Blu-ray disk drives, redundant array of independent disks (RAID) systems, and digital versatile disk (DVD) drives.

The machine executable instructions 2932 of FIGS. 21-28 may be stored in the mass storage device 2928, in the volatile memory 2914, in the non-volatile memory 2916, and/or on a removable non-transitory computer readable storage medium such as a CD or DVD.

From the foregoing, it will be appreciated that example methods, apparatus and articles of manufacture have been disclosed that encrypt media for identification. The disclosed methods, apparatus, and articles of manufacture improve the efficiency of using a computing device by improving digital security while reducing the memory requirements of securing media. For example, the disclosed methods, apparatus, and articles of manufacture encrypt media without increasing the size of the media. That is, the encrypted matrix is of the same dimensions as the prior, unencrypted matrix. The disclosed methods, apparatus and articles of manufacture are accordingly directed to one or more improvement(s) in the functioning of a computer.

Example methods, apparatus, systems, and articles of manufacture to encrypt media for identification are disclosed herein. Further examples and combinations thereof include the following:

Example 1 includes an apparatus comprising a mesh generation controller to generate a mesh based on an encryption matrix, an overlap controller to eliminate overlapping ones of edge connections of the mesh, an edge labelling controller to generate random labels for the edge connections based on a number of remaining ones of the edge connections of the mesh, an encrypted value controller to generate encrypted values based on the random labels, and an encryption controller to encrypt an input matrix with the encrypted values to enable identification of the input matrix.

Example 2 includes the apparatus of example 1, further including a mesh edge controller to count the number of the remaining ones of the edge connections of the mesh.

Example 3 includes the apparatus of example 1, wherein the edge labelling controller is configured to generate an edge labelling list based on the number of the remaining ones of the edge connections of the mesh, and randomly select, from the edge labelling list, the random labels for the edge connections.

Example 4 includes the apparatus of example 1, wherein the encryption matrix includes binary data.

Example 5 includes the apparatus of example 1, wherein the mesh is representative of one or more positions of ones in the encryption matrix.

Example 6 includes the apparatus of example 1, wherein the input matrix is associated with image data.

Example 7 includes the apparatus of example 6, wherein the encryption values replace pixel values of the image data.

Example 8 includes a non-transitory computer readable storage medium comprising instructions which, when executed, cause at least one processor to at least generate a mesh based on an encryption matrix, eliminate overlapping ones of edge connections of the mesh, generate random labels for the edge connections based on a number of remaining ones of the edge connections of the mesh, generate encrypted values based on the random labels, and encrypt an input matrix with the encrypted values to enable identification of the input matrix.

Example 9 includes the computer readable storage medium of example 8, wherein the instructions, when executed, cause the at least one processor to count the number of the remaining ones of the edge connections of the mesh.

Example 10 includes the computer readable storage medium of example 8, wherein the instructions, when executed, cause the at least one processor to generate an edge labelling list based on the number of the remaining ones of the edge connections of the mesh, and randomly select, from the edge labelling list, the random labels for the edge connections.

Example 11 includes the computer readable storage medium of example 8, wherein the encryption matrix includes binary data.

Example 12 includes the computer readable storage medium of example 8, wherein the mesh is representative of one or more positions of ones in the encryption matrix.

Example 13 includes the computer readable storage medium of example 8, wherein the input matrix is associated with image data.

Example 14 includes the computer readable storage medium of example 13, wherein the encryption values replace pixel values of the image data.

Example 15 includes an apparatus comprising means for controlling generation of meshes to generate a mesh based on an encryption matrix, means for controlling overlapping edges to eliminate overlapping ones of edge connections of the mesh, means for controlling labelling of edges to generate random labels for the edge connections based on a number of remaining ones of the edge connections of the mesh, means for controlling encrypted values to generate encrypted values based on the random labels, and means for controlling encryption to encrypt an input matrix with the encrypted values to enable identification of the input matrix.

Example 16 includes the apparatus of example 15, further including means for controlling mesh edges to count the number of the remaining ones of the edge connections of the mesh.

Example 17 includes the apparatus of example 15, wherein the means for controlling labelling of edges is configured to generate an edge labelling list based on the number of the remaining ones of the edge connections of the mesh, and randomly select, from the edge labelling list, the random labels for the edge connections.

Example 18 includes the apparatus of example 15, wherein the encryption matrix includes binary data.

Example 19 includes the apparatus of example 15, wherein the mesh is representative of one or more positions of ones in the encryption matrix.

Example 20 includes the apparatus of example 15, wherein the input matrix is associated with image data.

Example 21 includes the apparatus of example 20, wherein the encryption values replace pixel values of the image data.

Example 22 includes a method comprising generating, by executing an instruction with at least one processor, a mesh based on an encryption matrix, eliminating, by executing an instruction with the at least one processor, overlapping ones of edge connections of the mesh, generating, by executing an instruction with the at least one processor, random labels for the edge connections based on a number of remaining ones of the edge connections of the mesh, generating, by executing an instruction with the at least one processor, encrypted values based on the random labels, and encrypting, by executing an instruction with the at least one processor, an input matrix with the encrypted values to enable identification of the input matrix.

Example 23 includes the method of example 22, further including counting the number of the remaining ones of the edge connections of the mesh.

Example 24 includes the method of example 22, further including generating an edge labelling list based on the number of the remaining ones of the edge connections of the mesh, and randomly selecting, from the edge labelling list, the random labels for the edge connections.

Example 25 includes the method of example 22, wherein the encryption matrix includes binary data.

Example 26 includes the method of example 22, wherein the mesh is representative of one or more positions of ones in the encryption matrix.

Example 27 includes the method of example 22, wherein the input matrix is associated with image data.

Example 28 includes the method of example 27, wherein the encryption values replace pixel values of the image data.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   memory;
   machine readable instructions; and
   processor circuitry to execute the machine readable instructions to at least:
      access a mesh points matrix, the mesh points matrix representative of a mesh generated based on an encryption matrix and excluding overlapping edge connections;
      set an upper limit equal to a larger of two values of a vector, respective ones of the two values equal to elements of the vector at indices equal to respective values of a coordinate pair of the mesh points matrix;
      set a lower limit equal to a smaller of the two values of the vector;
      append a value to an encryption vector, the value based on whether the lower limit is equal to zero, the value equal to a lowest integer not less than a quotient of a number based on a square of the upper limit and two; and
      encrypt an input matrix with the encryption vector.

2. The apparatus of claim 1, wherein in response to the lower limit not equaling zero, the processor circuitry is to:
   determine the lowest integer not less than the quotient, the quotient being of (1) a difference between the square of the upper limit and a square of the lower limit and (2) two; and
   append the lowest integer not less than the quotient to the encryption vector.

3. The apparatus of claim 1, wherein in response to the lower limit equaling zero, the processor circuitry is to:
   determine the lowest integer not less than the quotient, the quotient being of (1) the square of the upper limit and (2) two; and
   append the lowest integer not less than the quotient to the encryption vector.

4. The apparatus of claim 1, wherein the coordinate pair includes non-zero values.

5. The apparatus of claim 1, wherein the input matrix is representative of media to be encrypted.

6. The apparatus of claim 1, wherein the encryption matrix includes a binary representation of a watermark.

7. The apparatus of claim 1, wherein the number is a first number, the value is a first value, and the processor circuitry is to append a second number of second values to the encryption vector, the second number of second values equal to a third number of non-zero coordinate pairs of the mesh points matrix.

8. A non-transitory computer readable storage medium comprising instructions which, when executed, cause processor circuitry to at least:
  access a mesh points matrix, the mesh points matrix representative of a mesh generated based on an encryption matrix and excluding overlapping edge connections;
  set an upper limit equal to a larger of two values of a vector, respective ones of the two values equal to elements of the vector at indices equal to respective values of a coordinate pair of the mesh points matrix;
  set a lower limit equal to a smaller of the two values of the vector;
  append a value to an encryption vector, the value based on whether the lower limit is equal to zero, the value equal to a lowest integer not less than a quotient of a number based on a square of the upper limit and two; and
  encrypt an input matrix with the encryption vector.

9. The computer readable storage medium of claim 8, wherein in response to the lower limit not equaling zero, the instructions cause the processor circuitry to:
  determine the lowest integer not less than the quotient, the quotient being of (1) a difference between the square of the upper limit and a square of the lower limit and (2) two; and
  append the lowest integer not less than the quotient to the encryption vector.

10. The computer readable storage medium of claim 8, wherein in response to the lower limit equaling zero, the instructions cause the processor circuitry to:
  determine the lowest integer not less than the quotient, the quotient being of (1) the square of the upper limit and (2) two; and
  append the lowest integer not less than the quotient to the encryption vector.

11. The computer readable storage medium of claim 8, wherein the coordinate pair includes non-zero values.

12. The computer readable storage medium of claim 8, wherein the input matrix is representative of media to be encrypted.

13. The computer readable storage medium of claim 8, wherein the encryption matrix includes a binary representation of a watermark.

14. The computer readable storage medium of claim 8, wherein the number is a first number, the value is a first value, and the instructions cause the processor circuitry to append a second number of second values to the encryption vector, the second number of second values equal to a third number of non-zero coordinate pairs of the mesh points matrix.

15. A method comprising:
  accessing a mesh points matrix, the mesh points matrix representative of a mesh generated based on an encryption matrix and excluding overlapping edge connections;
  setting, by executing an instruction with processor circuitry, an upper limit equal to a larger of two values of a vector, respective ones of the two values equal to elements of the vector at indices equal to respective values of a coordinate pair of the mesh points matrix;
  setting, by executing an instruction with the processor circuitry, a lower limit equal to a smaller of the two values of the vector;
  appending, by executing an instruction with the processor circuitry, a value to an encryption vector, the value based on whether the lower limit is equal to zero, the value equal to a lowest integer not less than a quotient of a number based on a square of the upper limit and two; and
  encrypting, by executing an instruction with the processor circuitry, an input matrix with the encryption vector.

16. The method of claim 15, further including in response to the lower limit not equaling zero:
  determining the lowest integer not less than the quotient, the quotient being of (1) a difference between the square of the upper limit and a square of the lower limit and (2) two; and
  appending the lowest integer not less than the quotient to the encryption vector.

17. The method of claim 15, further including in response to the lower limit equaling zero:
  determining the lowest integer not less than the quotient, the quotient being of (1) the square of the upper limit and (2) two; and
  appending the lowest integer not less than the quotient to the encryption vector.

18. The method of claim 15, wherein the coordinate pair includes non-zero values.

19. The method of claim 15, wherein the input matrix is representative of media to be encrypted.

20. The method of claim 15, wherein the encryption matrix includes a binary representation of a watermark.

21. The method of claim 15, wherein the number is a first number, the value is a first value, and the method further includes appending a second number of second values to the encryption vector, the second number of second values equal to a third number of non-zero coordinate pairs of the mesh points matrix.

* * * * *